US012572001B2

(12) United States Patent
Ebe et al.

(10) Patent No.: US 12,572,001 B2
(45) Date of Patent: Mar. 10, 2026

(54) ZOOM LENS AND IMAGE CAPTURE APPARATUS HAVING THE SAME

(71) Applicant: CANON KABUSHIKI KAISHA, Tokyo (JP)

(72) Inventors: Hiroki Ebe, Tochigi (JP); Shunji Iwamoto, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 360 days.

(21) Appl. No.: 18/048,814

(22) Filed: Oct. 21, 2022

(65) Prior Publication Data

US 2023/0139677 A1 May 4, 2023

(30) Foreign Application Priority Data

Oct. 28, 2021 (JP) ................................. 2021-176783

(51) Int. Cl.
*G02B 15/14* (2006.01)
*G02B 15/177* (2006.01)

(52) U.S. Cl.
CPC ................ *G02B 15/145527* (2019.08); *G02B 15/144511* (2019.08); *G02B 15/145511* (2019.08); *G02B 15/145519* (2019.08); *G02B 15/1465* (2019.08); *G02B 15/177* (2013.01)

(58) Field of Classification Search
CPC ........ G02B 15/1465; G02B 15/145503; G02B 15/145507; G02B 15/145511; G02B 15/145519; G02B 15/145515; G02B 15/145523; G02B 15/145527; G02B 15/145531; G02B 15/144503; G02B 15/144507; G02B 15/144511;
(Continued)

(56) References Cited

U.S. PATENT DOCUMENTS

2005/0248855 A1* 11/2005 Ito .................. G02B 15/144515
                                                      359/680
2012/0033308 A1* 2/2012 Heu ............... G02B 15/144507
                                                      359/684
(Continued)

FOREIGN PATENT DOCUMENTS

EP          3327480 A1 * 5/2018 ..... G02B 15/145515
JP      2015203734 A     11/2015
(Continued)

OTHER PUBLICATIONS

Gross et al. "Handbook of Optical Systems vol. 3: Aberration Theory and Correction of Optical Systems" Weinheim Germany, Wiley-VCH Verlag GmbH & Co. KGaA, pp. 377-379 (Year: 2007).*

*Primary Examiner* — Bumsuk Won
*Assistant Examiner* — Alex Park Rickel
(74) *Attorney, Agent, or Firm* — Canon U.S.A., Inc. IP Division

(57) ABSTRACT

A zoom lens includes a first lens unit having a negative refractive power, a second lens unit having a positive refractive power, and two or more additional lens units. In zooming, the first lens unit moves, and an interval between adjacent lens units changes. The refractive index of a negative lens A disposed on a most object side of negative lenses included in the first lens unit is higher than or equal to 1.89, and the negative lens A and a lens B disposed adjacent to an image side of the negative lens A satisfy a predetermined relationship.

12 Claims, 14 Drawing Sheets

(58) Field of Classification Search
　　CPC .... G02B 15/144513; G02B 15/144515; G02B
　　　　　　　　　　　　　　　　　　　　　15/177
　　USPC ........................................ 359/676, 683, 695
　　See application file for complete search history.

(56)　　　　　　　　References Cited

U.S. PATENT DOCUMENTS

| | | | |
|---|---|---|---|
| 2012/0257285 A1* | 10/2012 | Kuzuhara ...... | G02B 15/144515 |
| | | | 359/686 |
| 2013/0286257 A1* | 10/2013 | Tashiro ................... | G02B 9/60 |
| | | | 359/557 |
| 2014/0022416 A1* | 1/2014 | Shinohara ...... | G02B 15/144511 |
| | | | 359/686 |
| 2016/0124200 A1* | 5/2016 | Obikane ........... | G02B 27/0025 |
| | | | 359/557 |
| 2019/0302431 A1* | 10/2019 | Kawamura .......... | G02B 15/177 |
| 2019/0306389 A1 | 10/2019 | Kawamura | |
| 2019/0331877 A1* | 10/2019 | Umeda ................. | G02B 13/02 |

FOREIGN PATENT DOCUMENTS

| | | | |
|---|---|---|---|
| JP | 2018084737 A | 5/2018 | |
| JP | 2021156963 A | 10/2021 | |
| WO | WO-2013027362 A1 * | 2/2013 | ............. G02B 15/20 |

* cited by examiner d LINE
g LINE
M
S
g LINE

Fno= 4.6     ω= 54.5°     ω= 54.5°     ω= 54.5°

-0.400    0.400    -0.400    0.400    -20.000    20.000    -0.050    0.050

SPHERICAL ABERRATION     ASTIGMATISM     DISTORTION (%)     CHROMATIC ABERRATION

Fno= 6.36     ω= 36.3°     ω= 36.3°     ω= 36.3°

-0.400    0.400    -0.400    0.400    -20.000    20.000    -0.050    0.050

SPHERICAL ABERRATION     ASTIGMATISM     DISTORTION (%)     CHROMATIC ABERRATION

SPHERICAL ABERRATION

ASTIGMATISM

DISTORTION (%)

CHROMATIC ABERRATION

SPHERICAL ABERRATION

ASTIGMATISM

DISTORTION (%)

CHROMATIC ABERRATION

SPHERICAL ABERRATION    ASTIGMATISM    DISTORTION (%)    CHROMATIC ABERRATION

SPHERICAL ABERRATION    ASTIGMATISM    DISTORTION (%)    CHROMATIC ABERRATION d LINE
g LINE
M
S
g LINE

Fno= 4.54       ω = 54.5°       ω = 54.5°       ω = 54.5°

-0.400    0.400    -0.400    0.400    -20.000    20.000    -0.050    0.050

SPHERICAL
ABERRATION       ASTIGMATISM       DISTORTION (%)       CHROMATIC
ABERRATION

Fno= 5.73       ω = 36.6°       ω = 36.6°       ω = 36.6°

-0.400    0.400    -0.400    0.400    -20.000    20.000    -0.050    0.050

SPHERICAL
ABERRATION       ASTIGMATISM       DISTORTION (%)       CHROMATIC
ABERRATION

FIRST
REFLECTION SURFACE

SECOND
REFLECTION SURFACE

OFF-AXIS
PRINCIPAL RAY

ZOOM LENS AND IMAGE CAPTURE APPARATUS HAVING THE SAME

BACKGROUND

Technical Field

The aspect of the embodiments relates to a zoom lens and the like and is suitable for an image capture apparatus, such as a digital camcorder, a digital still camera, a broadcast camera, and a silver-halide film camera.

Description of the Related Art

Wide angle lenses are widely used for landscape photography, astronomical photography, and the like. Wide angle lenses are desired to have a wide view angle with high optical performance.

Japanese Patent Laid-Open No. 2015-203734 describes a zoom lens that provides a wide view angle with high performance by adopting a plurality of negative lenses into a first lens unit to gently deflect off-axis rays.

In the zoom lens described in Japanese Patent Laid-Open No. 2015-203734, the lens open angle of a first lens is large, and unnecessary light obliquely reflected on an object-side lens surface of a second lens with respect to the lens surface reflects on an image-side lens surface of the first lens and reaches an image plane. If such unnecessary light reaches an image plane, a ghost effect may undesirably occur on a photo.

SUMMARY

A zoom lens includes a first lens unit having a negative refractive power, a second lens unit having a positive refractive power, and two or more additional lens units. The first lens unit, the second lens unit, and the two or more additional lens units are disposed in order from an object side toward an image side, and, in zooming, the first lens unit is arranged to move, and an interval between adjacent lens units changes. The refractive index of a negative lens A disposed on a most object side of negative lenses included in the first lens unit is higher than or equal to 1.89. Where the radius of curvature of an image-side lens surface of the negative lens A is Ra, the radius of curvature of an object-side lens surface of a lens B disposed adjacent to the image side of the negative lens A is Rb, an air gap between the negative lens A and the lens B is Da, and an air gap between the lens B and a lens disposed adjacent to an image side of the lens B is Db, inequalities $$2.0 < Ra/Da < 100, \text{ and}$$

$$10 < Rb/Db < 100$$

are satisfied.

Further features of the disclosure will become apparent from the following description of exemplary embodiments with reference to the attached drawings.

DESCRIPTION OF THE EMBODIMENTS

Figure 1:
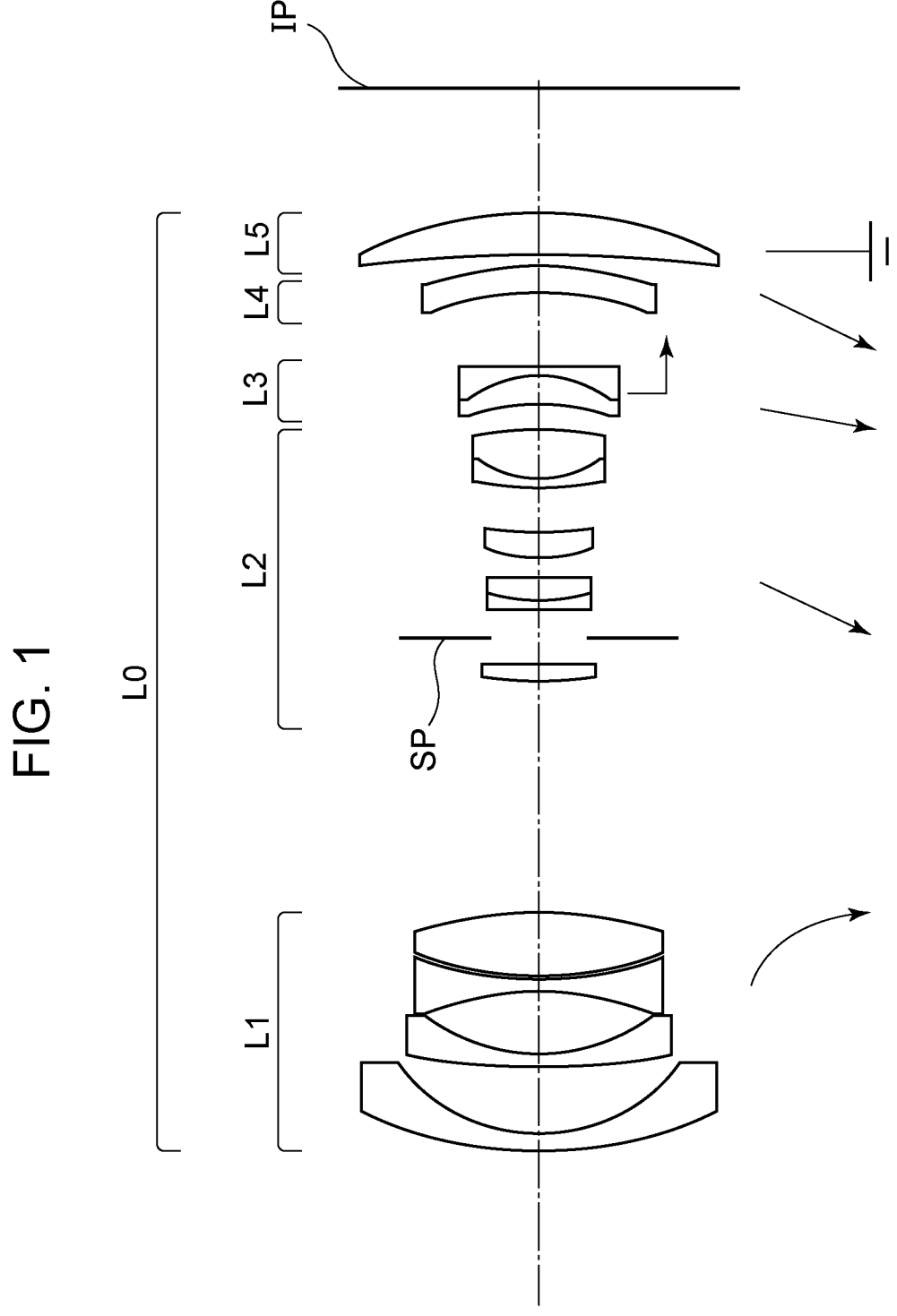
FIG. 1 is a lens sectional view of a zoom lens according to a first embodiment.
Figure 2A:
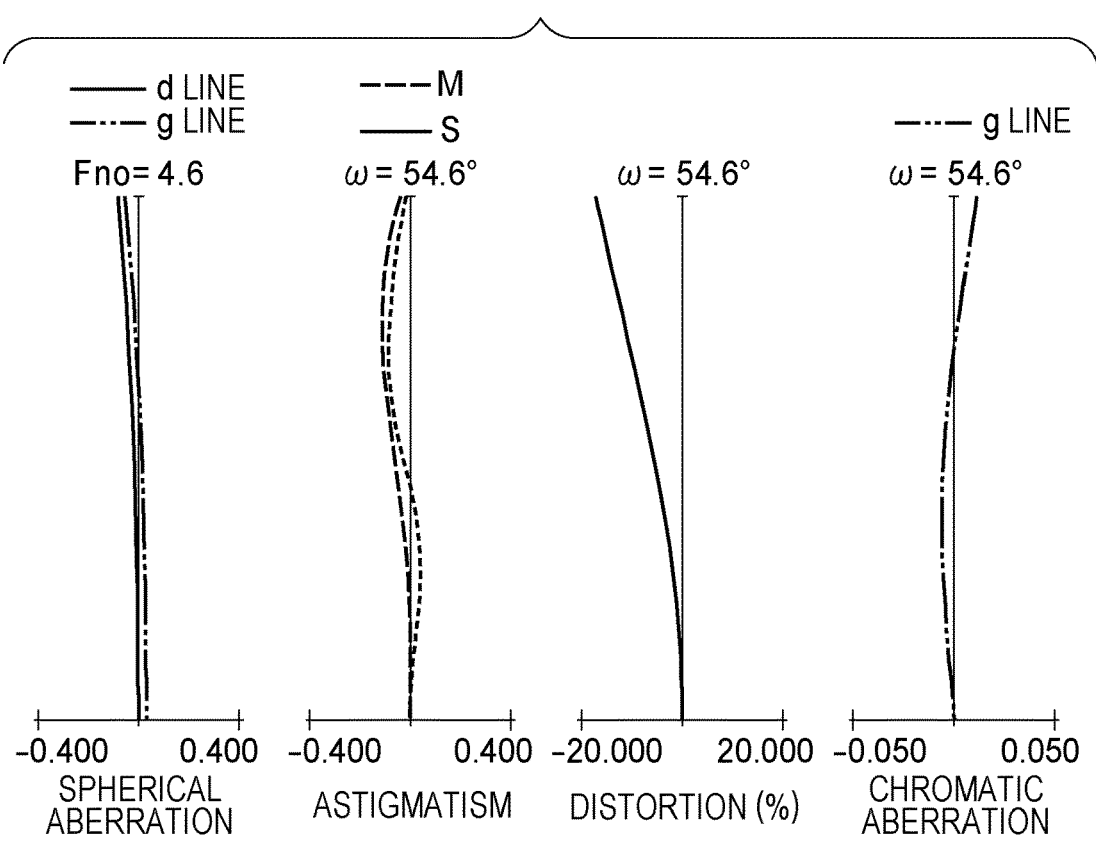
FIGS. 2A and 2B are aberration charts of the zoom lens according to the first embodiment.
Figure 2B:
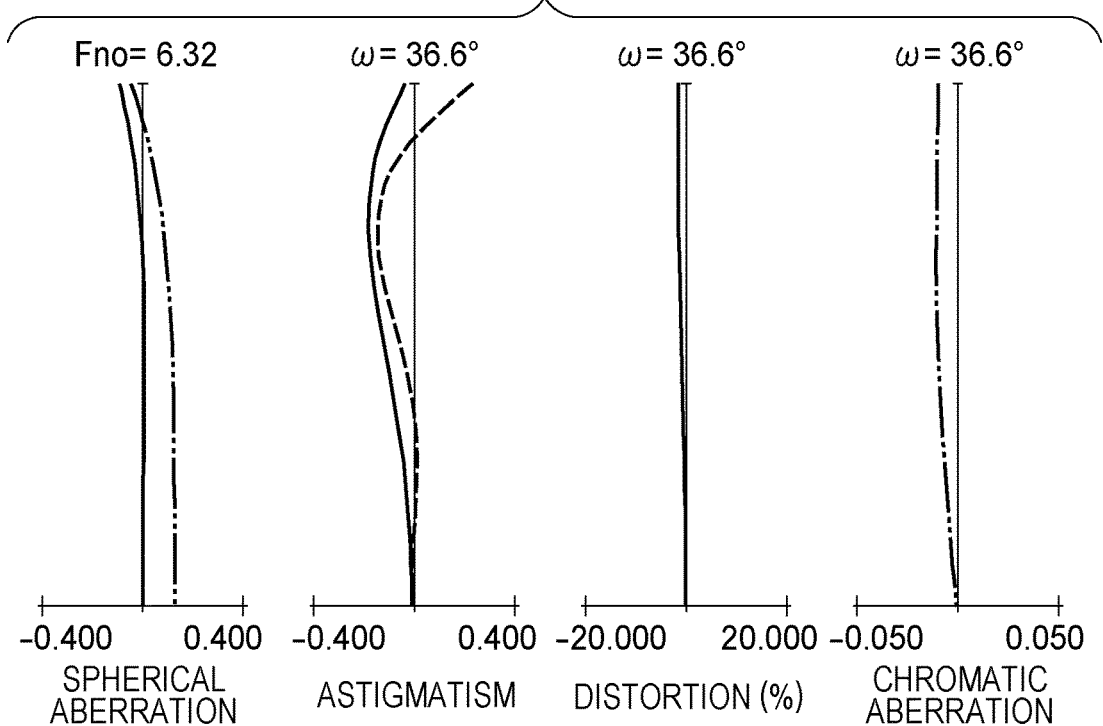
Figure 3:
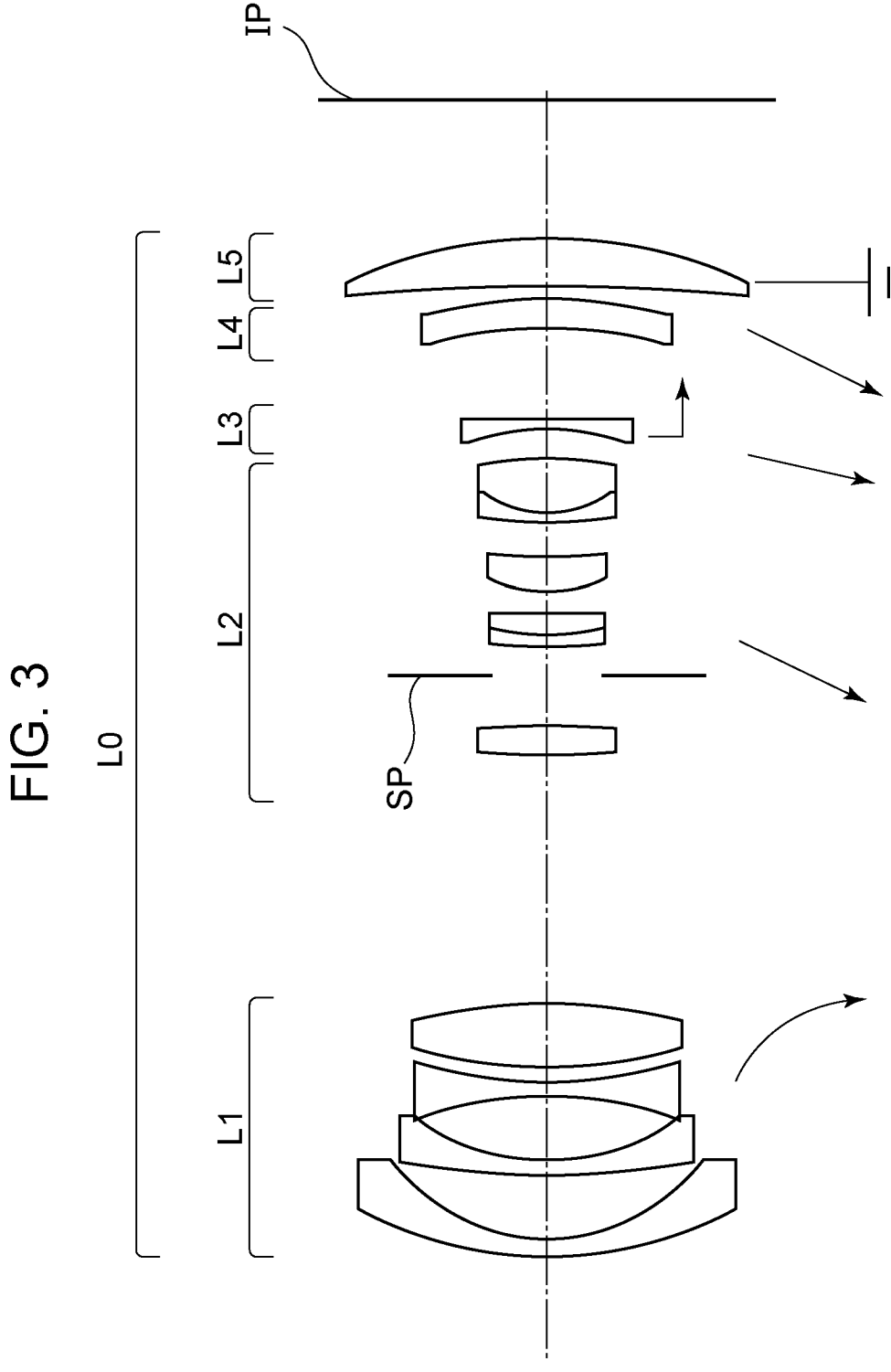
FIG. 3 is a lens sectional view of a zoom lens according to a second embodiment.
Figure 4A:
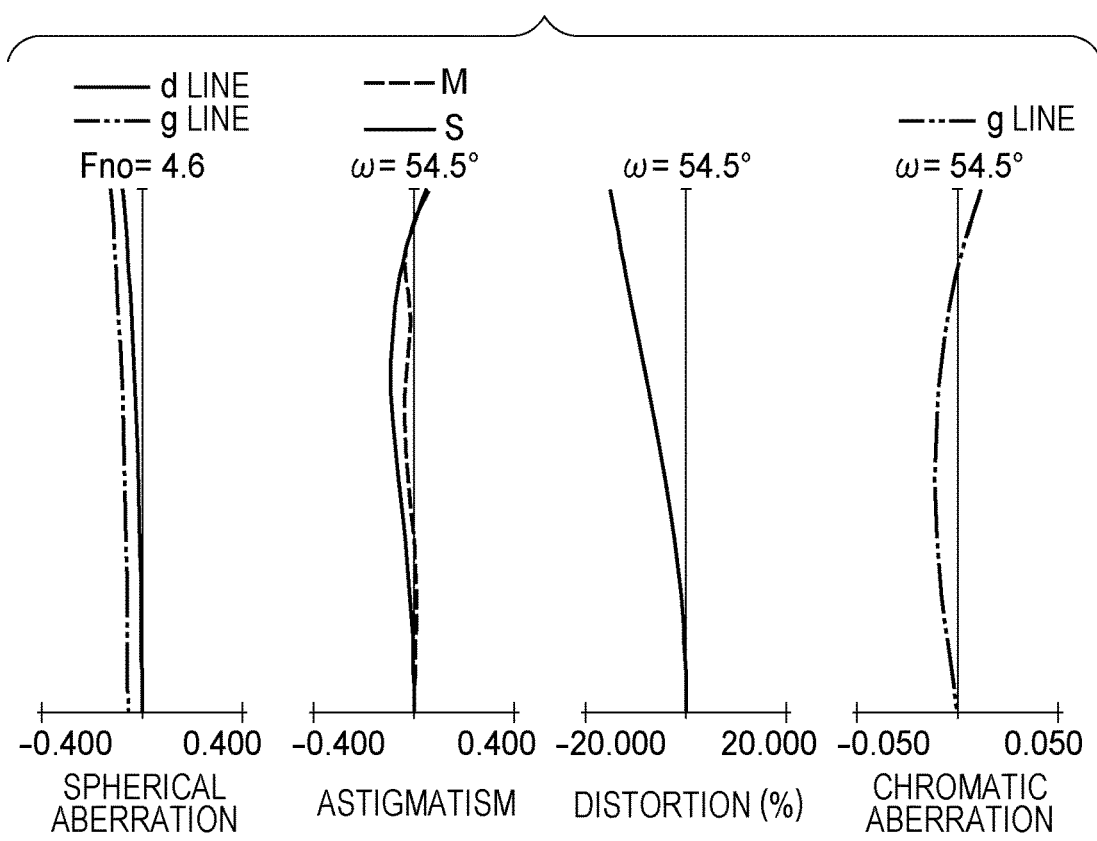
FIGS. 4A and 4B are aberration charts of the zoom lens according to the second embodiment.
Figure 4B:
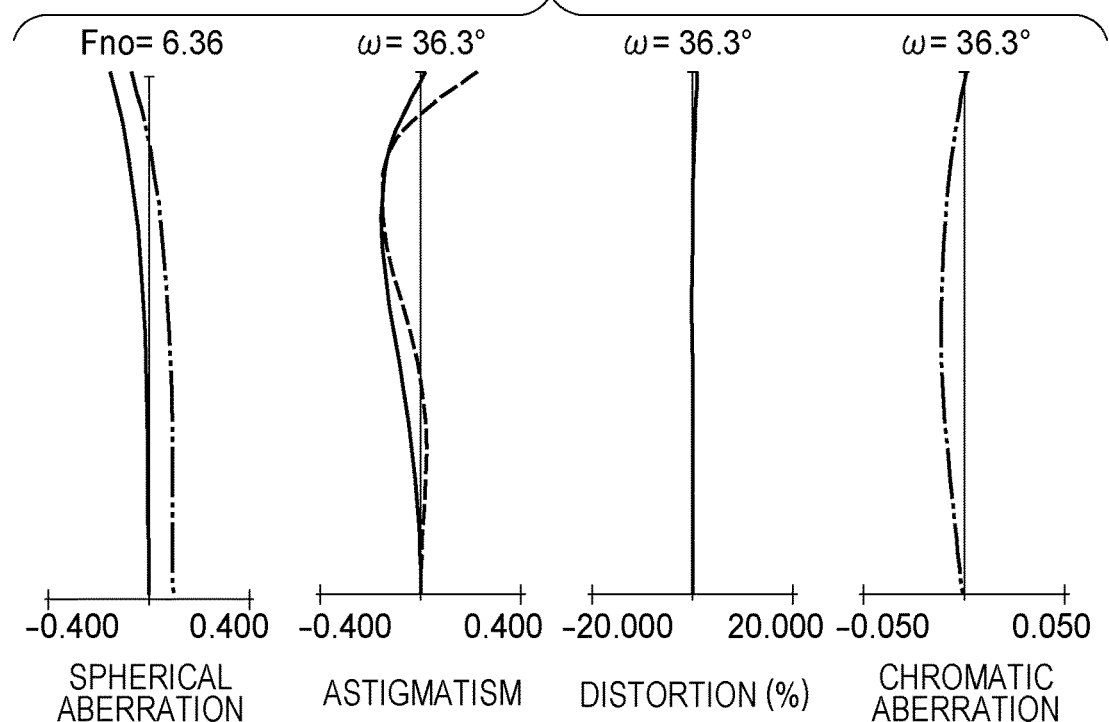
Figure 5:
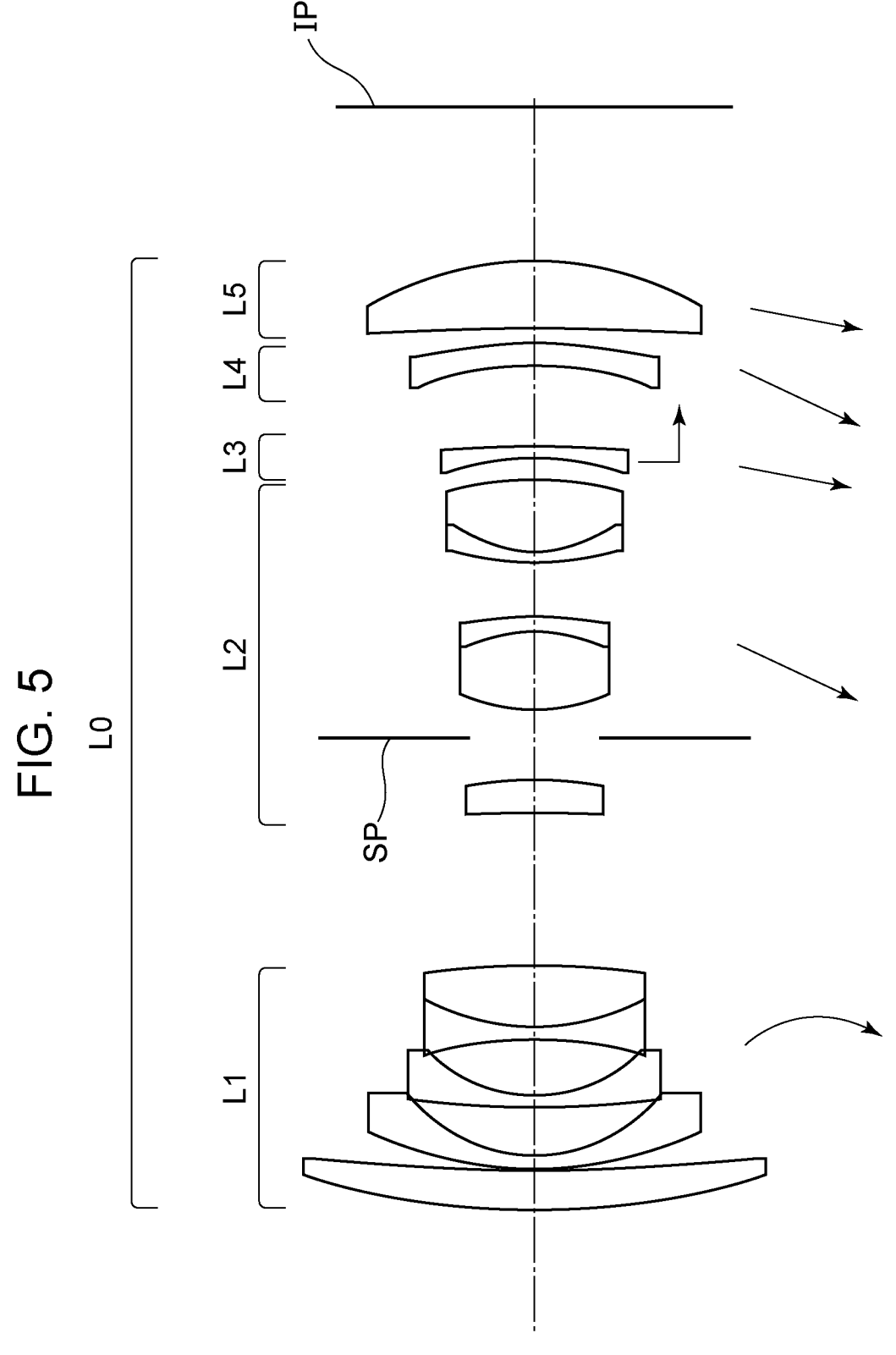
FIG. 5 is a lens sectional view of a zoom lens according to a third embodiment.
Figure 6A:
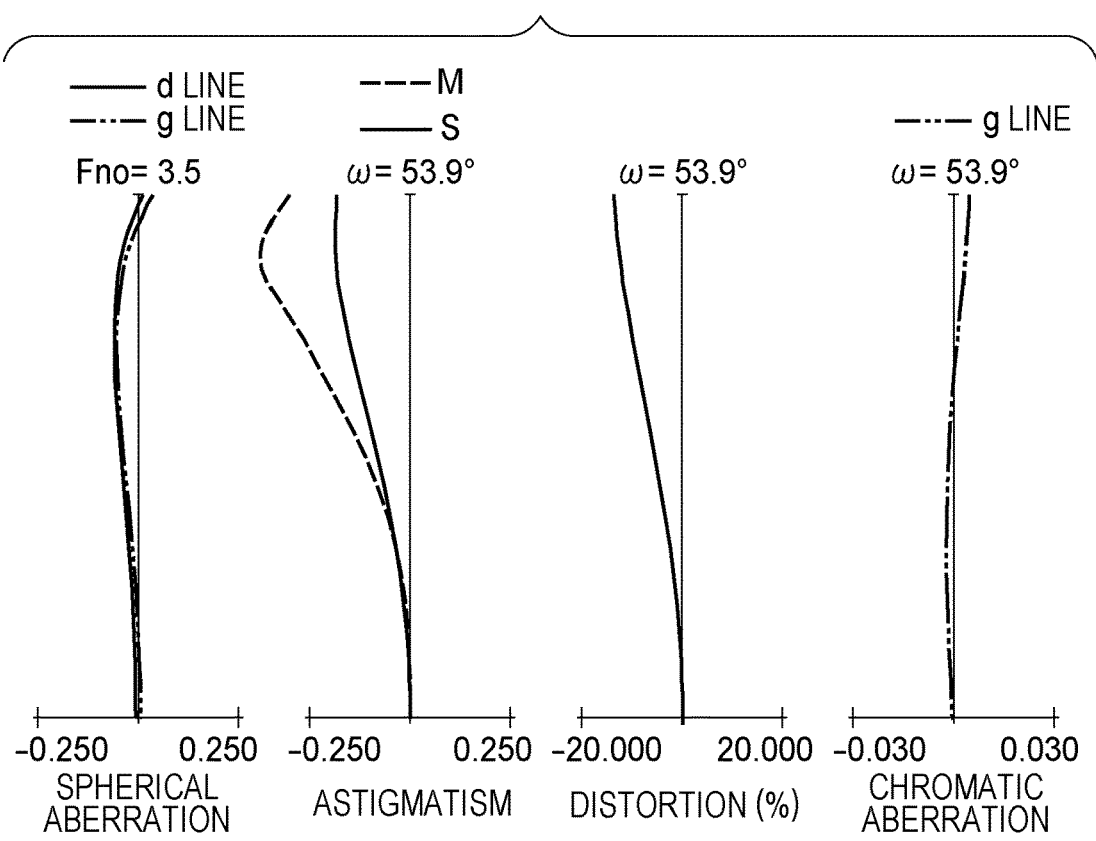
FIGS. 6A and 6B are aberration charts of the zoom lens according to the third embodiment.
Figure 6B:
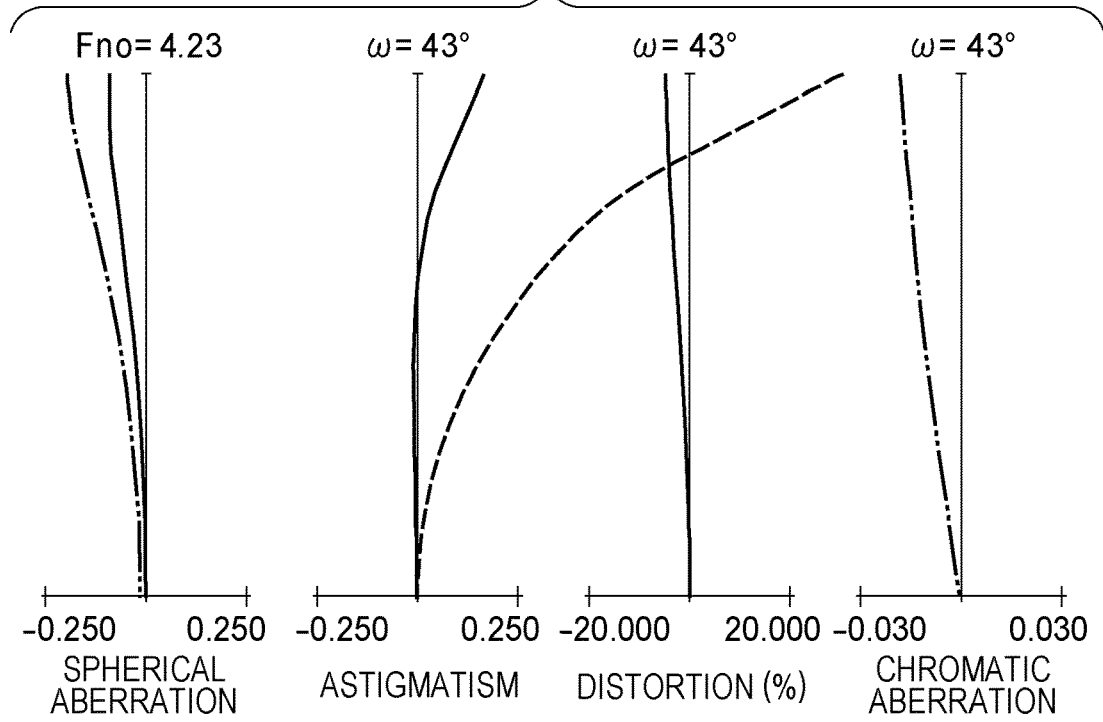
Figure 7:
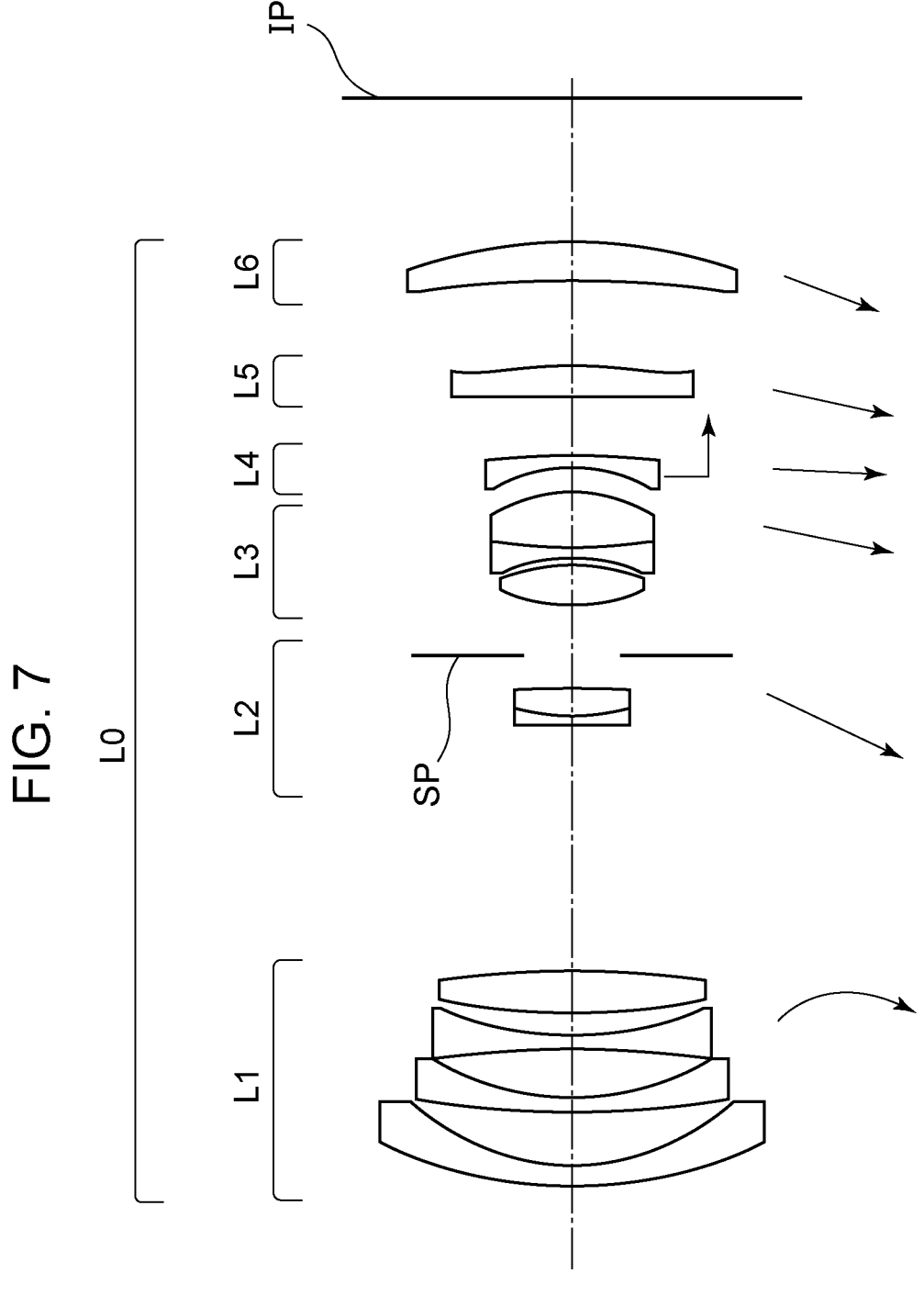
FIG. 7 is a lens sectional view of a zoom lens according to a fourth embodiment.
Figure 8A:
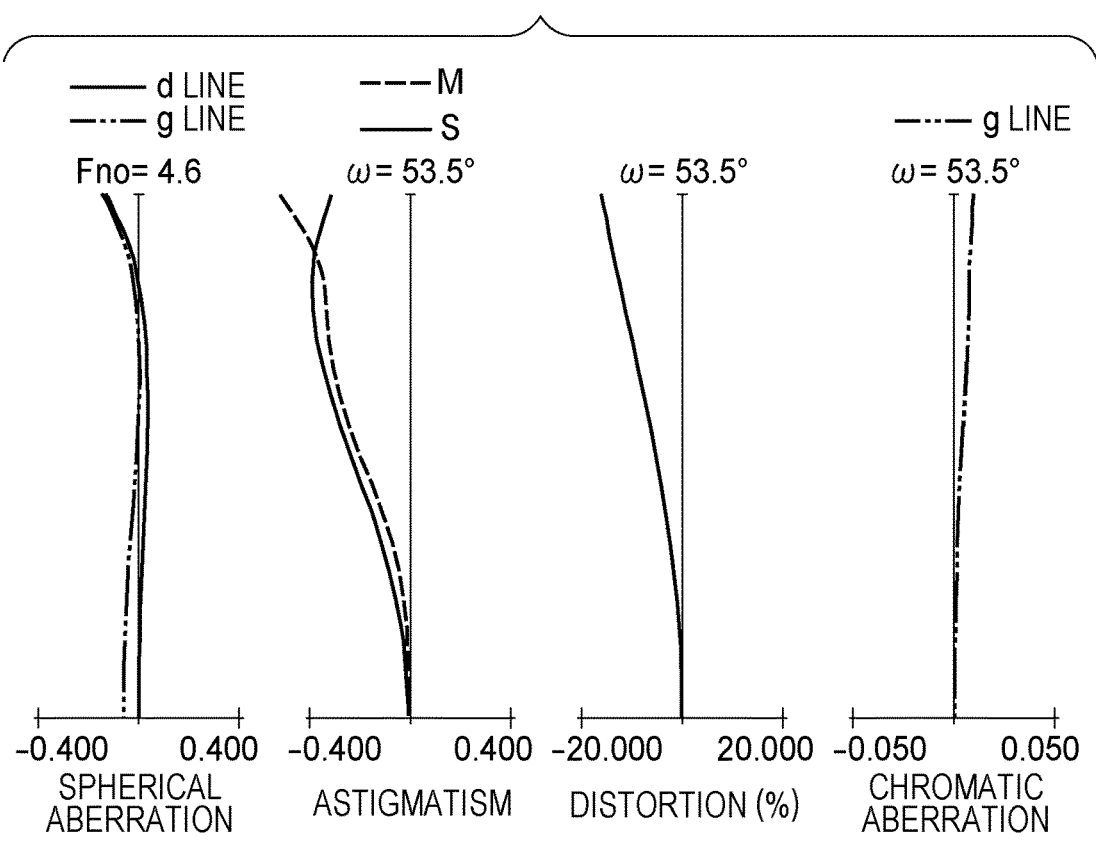
FIGS. 8A and 8B are aberration charts of the zoom lens according to the fourth embodiment.
Figure 8B:
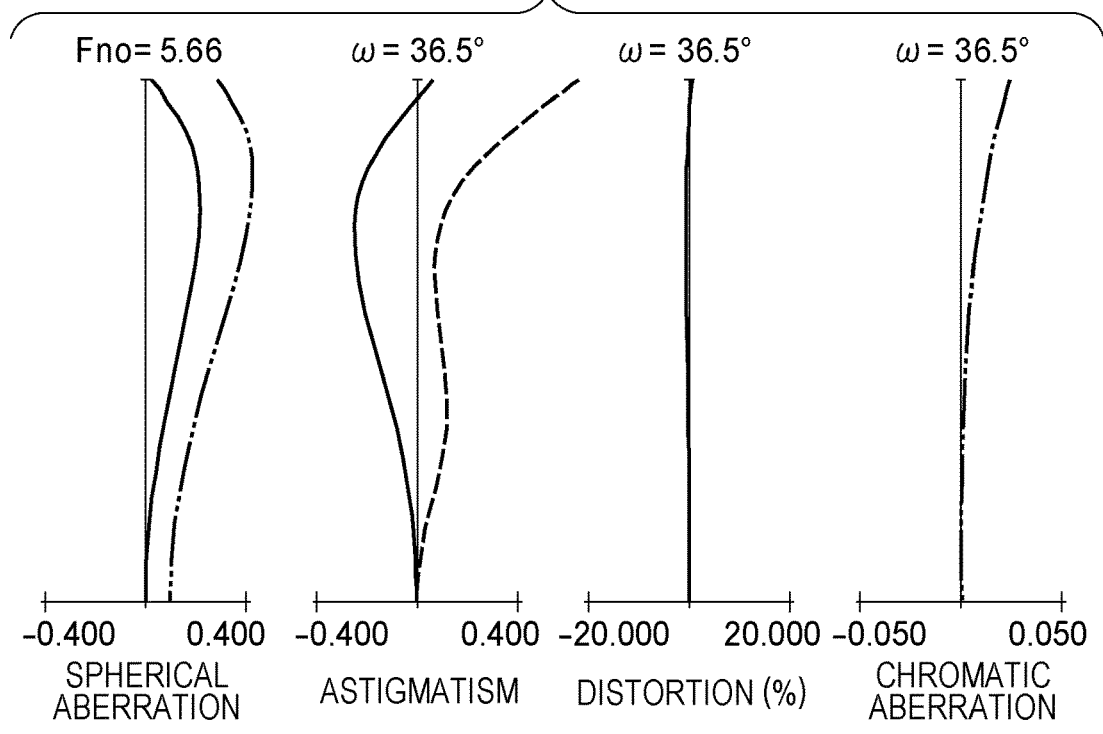
Figure 9:
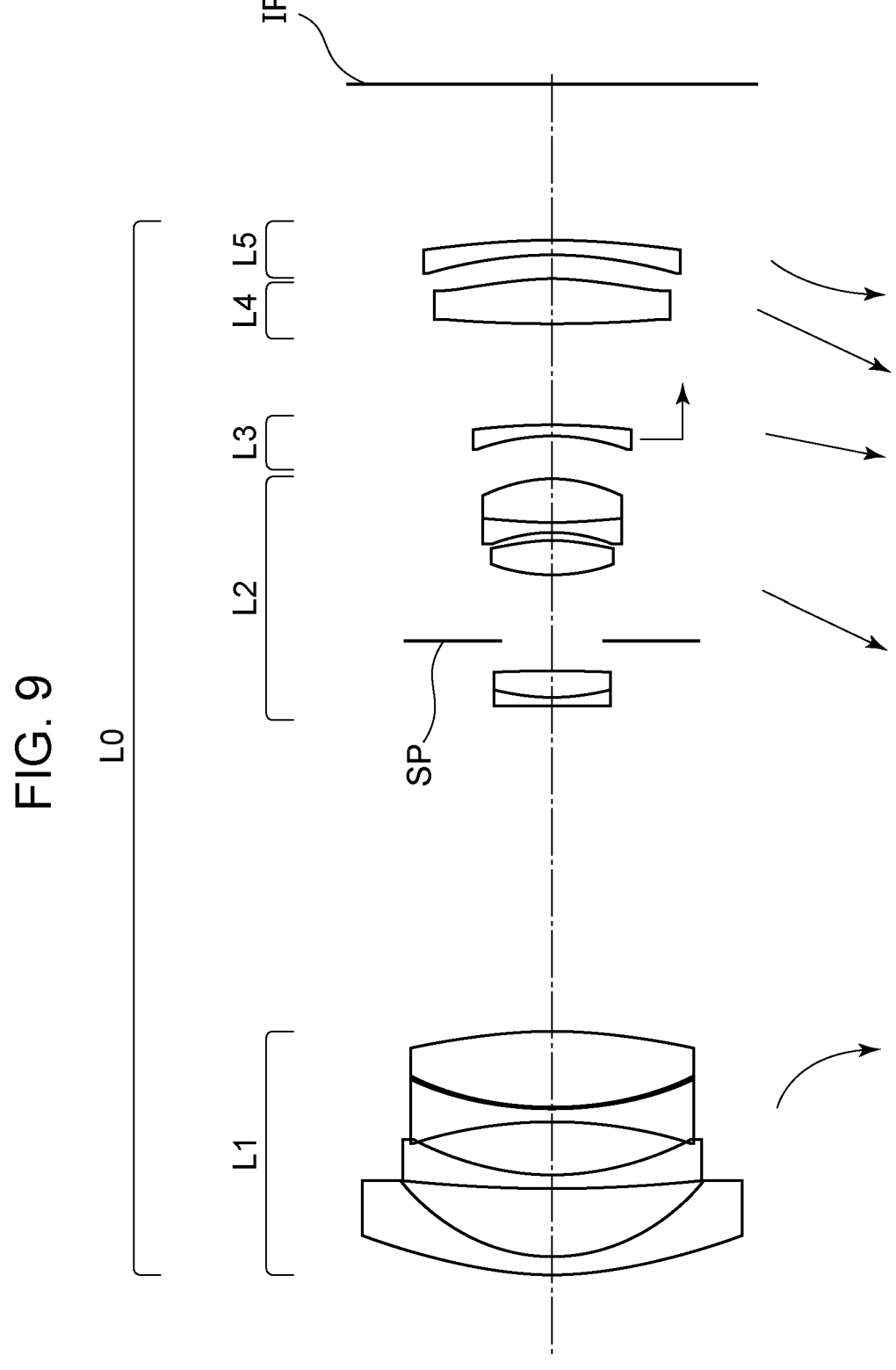
FIG. 9 is a lens sectional view of a zoom lens according to a fifth embodiment.
Figure 10A:
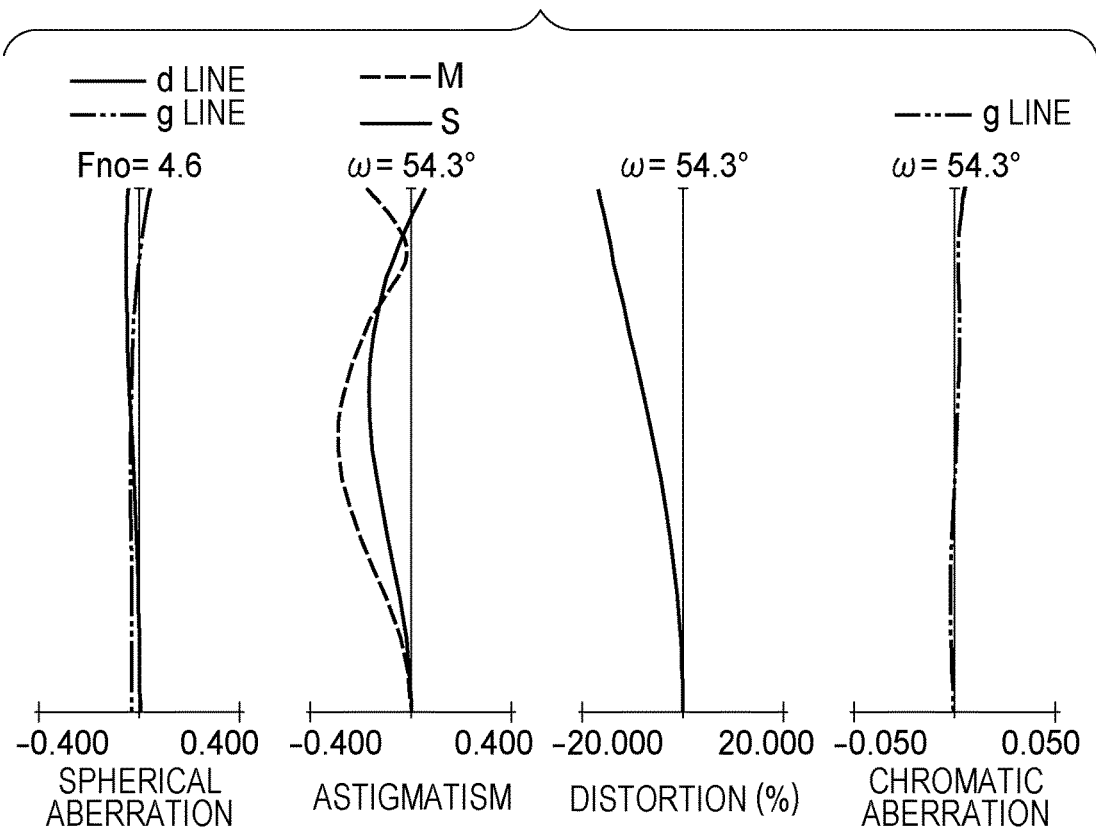
FIGS. 10A and 10B are aberration charts of the zoom lens according to the fifth embodiment.
Figure 10B:
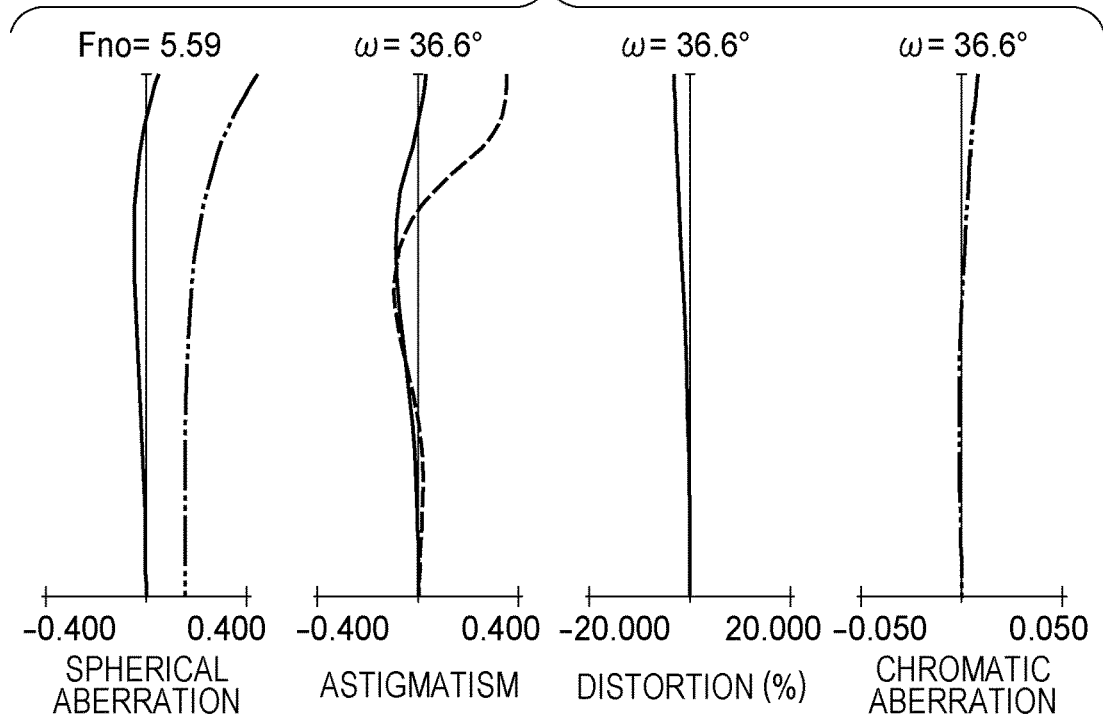
Figure 11:
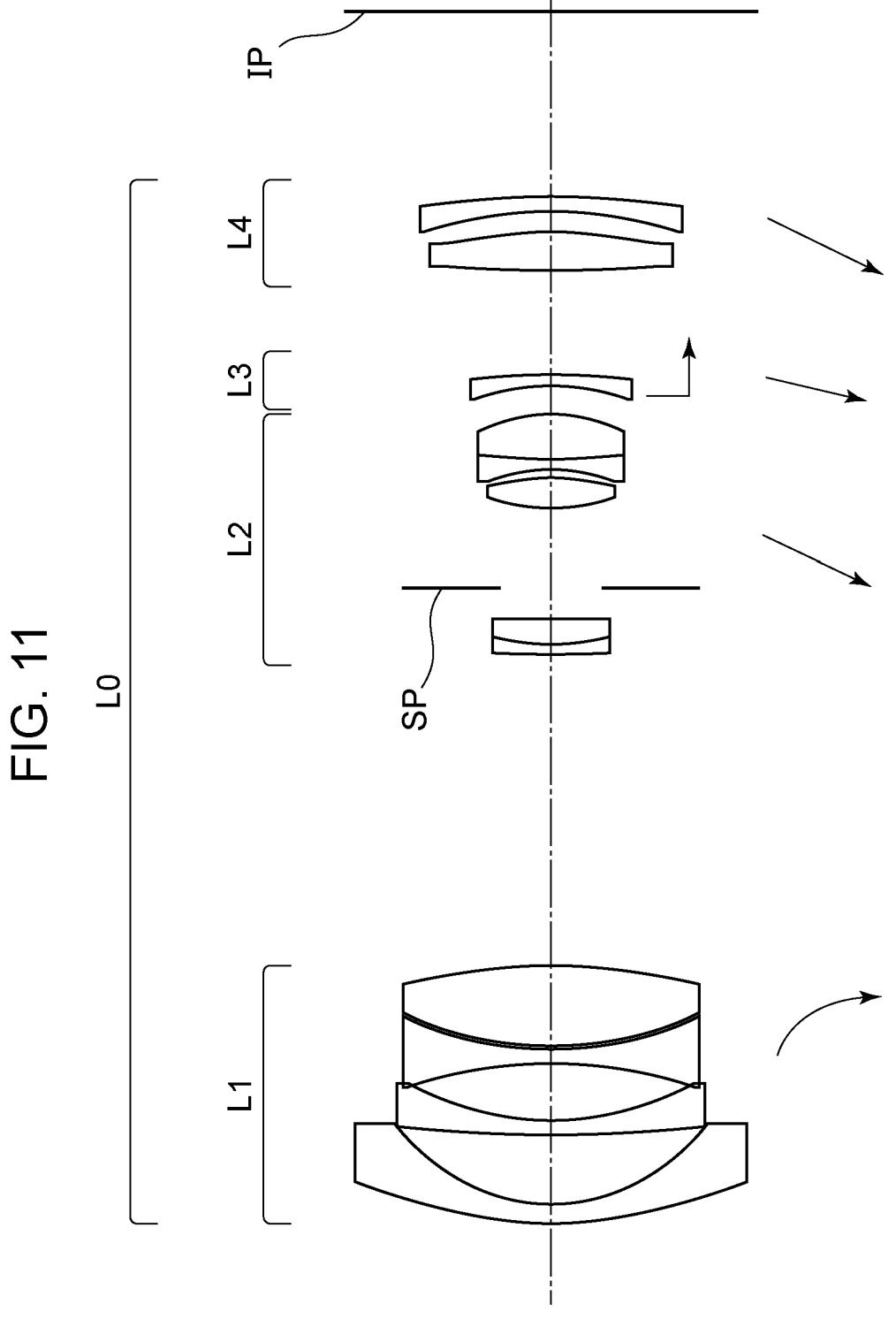
FIG. 11 is a lens sectional view of a zoom lens according to a sixth embodiment.
Figure 12A:
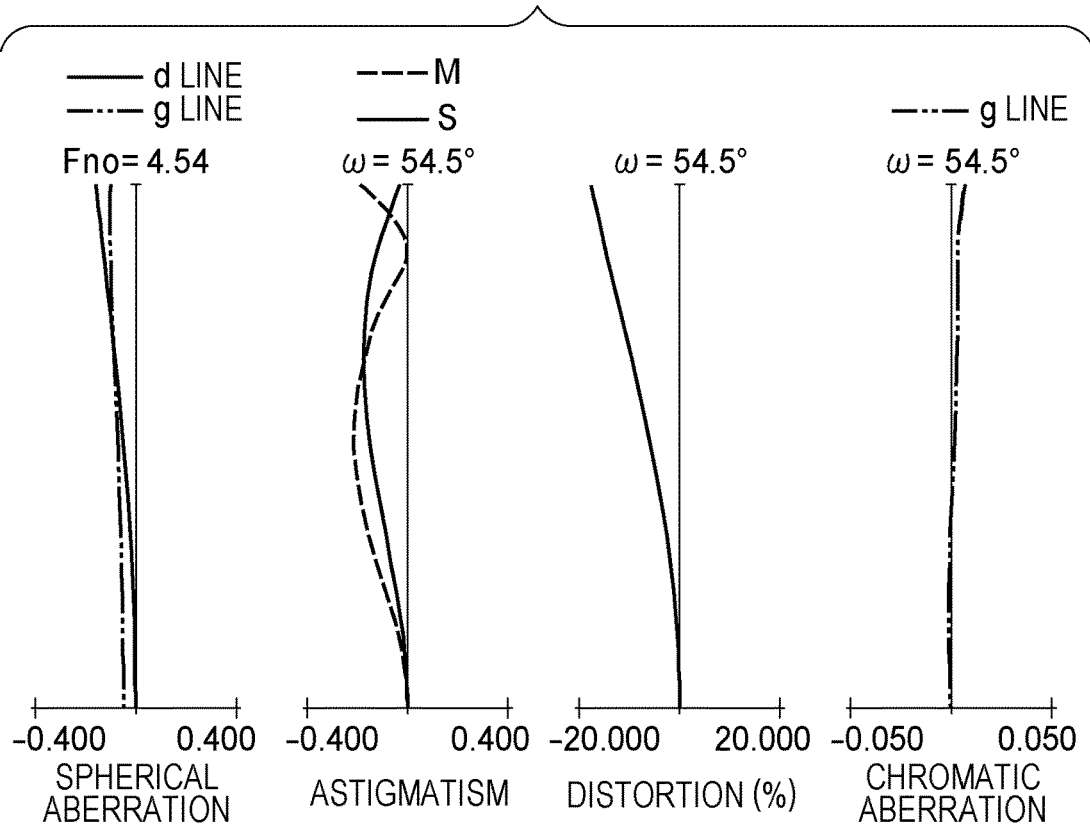
FIGS. 12A and 12B are aberration charts of the zoom lens according to the sixth embodiment.
Figure 12B:
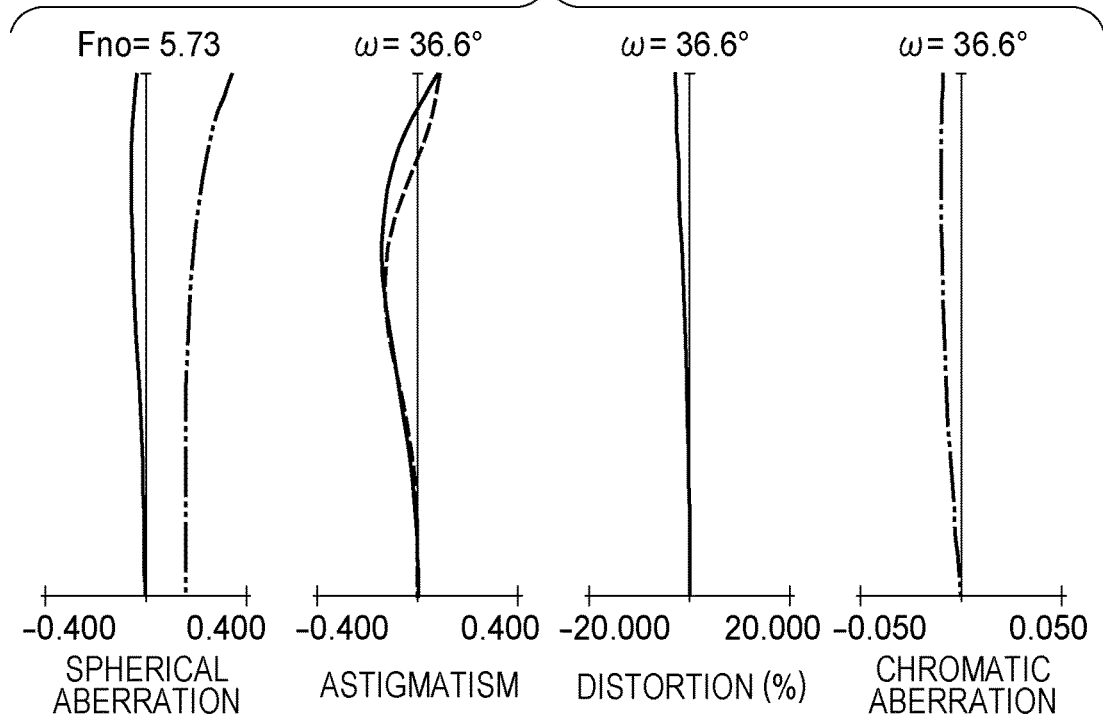

Hereinafter, embodiments of the zoom lens and the image capture apparatus according to the disclosure will be described with reference to the attached drawings.

FIGS. 1, 3, 5, 7, 9, and 11 are respectively the sectional views of zoom lenses L0 according to first to sixth embodiments. The zoom lens L0 of each embodiment is a zoom lens used in an image capture apparatus, such as a digital camcorder, a digital still camera, a broadcast camera, a silver-halide film camera, a monitoring camera, and an onboard camera.

In each lens sectional view, the left side is an object side, and the right side is an image side. The zoom lens L0 of each embodiment may be used as a projector lens. At this time, the left side is a screen side, and the right side is a projected image side.

The zoom lens L0 of each embodiment includes a first lens unit L1 having a negative refractive power, a second lens unit L2 having a positive refractive power, and two or more additional lens units, disposed in order from the object side toward the image side. In each sectional view, Li represents an ith lens unit that is the ith from the object side (i is a natural number). In the specification, a lens unit is a set of lenses that integrally move or stand still in zooming. In other words, the interval between adjacent lens units changes in zooming. Each lens unit may be made up of a single lens or may be made up of a plurality of lenses. Each lens unit may include an aperture stop.

The arrows shown in each lens sectional view represent movement loci in zooming from a wide angle end to a telephoto end and movement loci in focusing from an infinite distance to a short range.

In each lens sectional view, SP indicates an aperture stop. IP indicates an image plane, and, when the zoom lens of each embodiment is used in a digital still camera or a digital camcorder, the image pickup surface of a solid-state image pickup device (photoelectric conversion device), such as a Charge-Coupled Device (CCD) sensor and a Complementary Metal-Oxide-Semiconductor (CMOS) sensor, is disposed. When the zoom lens of each embodiment is used as a shooting zoom lens of a silver-halide film camera, a photo surface corresponding to a film surface is placed at the image plane IP.

FIGS. 2, 4, 6, 8, 10, and 12 are respectively aberration charts of zoom lenses according to the first to sixth embodiments. In each aberration chart, (A) is an aberration chart at a wide angle end, and (B) is an aberration chart at a telephoto end.

In a spherical aberration chart, Fno is an F-number and represents a spherical aberration for d line (wavelength: 587.6 nm) and a spherical aberration for g line (wavelength: 435.8 nm). In an astigmatism chart, S represents an aberration at a sagittal image plane, and M represents an aberration at a meridional image plane. A distortion aberration chart represents a distortion aberration for d line. A chromatic aberration chart represents a lateral chromatic aberration for g line. ω is an image pickup half view angle (°).

Next, the characteristic configuration of the zoom lens of each embodiment will be described.

In the zoom lens of each embodiment, by setting the refractive power of the first lens unit L1 to a negative value, the entrance pupil position is shifted toward the object side to reduce the diameter of a front lens (lens disposed on the most object side).

By setting the refractive power of the second lens unit L2 to a positive value, an axial marginal ray diverged by the first lens unit L1 is converged so as to reduce the diameters of portions downstream of the second lens unit L2. In addition, by providing two or more additional lens units on the image side of the positive second lens unit L2 and moving the first lens unit L1 in zooming, aberration is favorably corrected within a wide zoom range.

In the zoom lens L0 of each embodiment, the refractive index of the most object-side negative lens A of the negative lenses in the first lens unit L1 is higher than or equal to 1.89. Furthermore, the following inequalities are satisfied. Here, Ra is the radius of curvature of the image-side lens surface of the negative lens A. Rb is the radius of curvature of the object-side lens surface of the lens B disposed adjacent to the image side of the negative lens A. Da is an air gap between the negative lens A and the lens B. Db is an air gap between the lens B and a lens disposed adjacent to the image side of the lens B.

$$2.0 < Ra/Da < 100 \tag{1}$$

$$10 < Rb/Db < 100 \tag{2}$$

Figure 14:
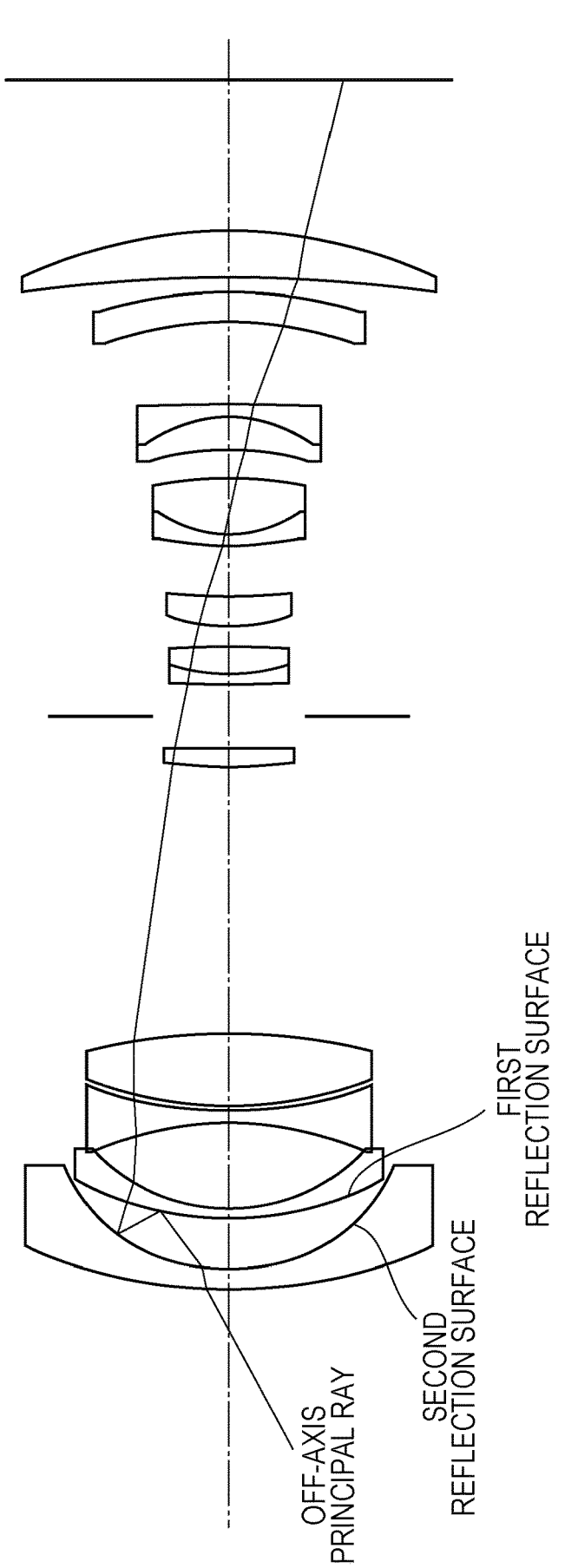
FIG. 14 is a schematic diagram showing the optical path of unnecessary light.

A wide angle lens tends to have an increased diameter of a first lens disposed on the most object side in the first lens unit, and tends to have an increased lens open angle. At this time, as shown in FIG. 14, light reflected on the object-side lens surface of a second lens disposed on the image side of the first lens is further reflected on the image-side lens surface of the first lens, and an optical path that reaches the image plane can be formed. At this time, since the first reflection and the second reflection both are oblique reflection with respect to the lens surface, the reflection intensity is relatively high, so the reflected light can produce a noticeable ghosting effect at the image plane.

For this reason, in the zoom lens L0 of each embodiment, the refractive index of the negative lens A is set to 1.89 to impart a necessary refractive power to the negative lens A while increasing a lens open angle. By increasing the curvature of the image-side lens surface of the negative lens A and the curvature of the object-side lens surface of the lens B within the range in which the inequalities (1) and (2) are satisfied, off-axis rays reflect at an angle close to a right angle with respect to the lens surface, so the intensity of the ghosting effect is reduced. When any one of the curvatures exceeds the upper limit value of a corresponding one of the inequalities (1) and (2), it is difficult to impart a necessary refractive power to the negative lens A or the lens B.

With the above configuration, it is possible to achieve a zoom lens capable of reducing occurrence of ghost images while having high optical performance.

At least one of the upper limit value and the lower limit value of the numeric range of any one of the inequalities (1) and (2) is preferably set to the following inequality (1a) or inequality (2a).

$$2.3 < Ra/Da < 50 \tag{1a}$$

$$11 < Rb/Db < 50 \tag{2a}$$

More preferably, at least one of the upper limit value and the lower limit value of the numeric range of any one of the inequalities (1) and (2) is preferably set to the following inequality (1b) or inequality (2b).

$$2.6 < Ra/Da < 10 \tag{1b}$$

$$11.5 < Rb/Db < 30 \tag{2b}$$

By setting the refractive index of the negative lens A to a value higher than 1.89, the lens open angle of the negative lens A can be set more preferably from the viewpoint of reduction of ghost images.

Next, the configuration of the zoom lens L0 according to each embodiment will be described.

The lens B disposed adjacent to the image side of the negative lens A can be a negative lens. With this configuration, negative lenses including the negative lens A are successively disposed, so off-axis rays are able to be gently deflected. Thus, it is possible to favorably reduce particularly astigmatism and field curvature at the wide angle end.

The first lens unit L1 can be made up of three negative lenses and a positive lens, disposed in order from the object side toward the image side. By successively disposing three negative lenses, it is possible to reduce astigmatism and field curvature at the wide angle end. By disposing a positive lens at the most image side, it is possible to further reduce particularly lateral chromatic aberration at the wide angle end.

Next, inequalities that can be satisfied for the zoom lens L0 of each embodiment will be described.

The zoom lens L0 of each embodiment preferably satisfies one or more of the following inequalities.

$$1.80 < NdB \tag{3}$$

$$2.0 < d/fw < 15 \tag{4}$$

$$1.5 < d2/fw < 5.0 \tag{5}$$

$$0.15 < GL/TL < 0.30 \tag{6}$$

$$-20 < 100 \times (y - y0)/y0 < -8 \tag{7}$$

$$-2.5 < f1/fw < -0.8 \tag{8}$$

$$-3.5 < fa/fw < -1.5 \tag{9}$$

$$-3.5 < fb/fw < -0.8 \tag{10}$$

$$1.2 < ft/fw < 2.1 \tag{11}$$

Here, NdB is the refractive index of the lens B for d line. d is a distance from the image-side lens surface of the negative lens A to the aperture stop SP at the wide angle end. fw is the focal length of the entire system of the zoom lens L0 at the wide angle end. d2 is a distance from the image-side lens surface of the lens B to the aperture stop SP at the wide angle end. GL is a distance from the most object-side lens surface of the first lens unit L1 to the most image-side lens surface of the first lens unit L1. TL is a distance from the most object-side lens surface of the zoom lens L0 to the image plane IP (paraxial imaging plane) at the wide angle end. y is the maximum value of a real image height at the wide angle end. y0 is an ideal image height at a view angle associated with the maximum real image height y (maximum view angle) at the wide angle end. f1 is the focal length of the first lens unit L1. fa is the focal length of the negative lens A. fb is the focal length of the lens B. ft is the focal length of the entire system of the zoom lens L0 at the telephoto end.

Hereinafter, the technical meaning of each inequality will be described.

When the value is lower than the lower limit value of the inequality (3), the lens open angle needed at the time of imparting a desired refractive power to the lens B reduces, so particularly reflection on the object-side lens surface of the lens B can be problematic.

The inequality (4) means the ratio of a distance from the image-side lens surface of the negative lens A to the aperture stop SP at the wide angle end to the focal length of the entire system at the wide angle end. When the value exceeds the upper limit value, the distance from the image-side lens surface of the negative lens A to the aperture stop SP at the wide angle end is too long, so the size of the negative lens A tends to increase. When the value is lower than the lower limit value, it is difficult to sufficiently reduce the intensity of ghost images due to unnecessary light that reflects between the negative lens A and the lens B.

The inequality (5) means the ratio of a distance from the image-side lens surface of the lens B to the aperture stop SP at the wide angle end to the focal length of the entire system at the wide angle end. When the value exceeds the upper limit value, the distance from the image-side lens surface of the lens B to the aperture stop SP at the wide angle end is too long, so the size of the lens B tends to increase. When the value is lower than the lower limit value, it is difficult to sufficiently reduce the intensity of ghost images due to unnecessary light that reflects between the negative lens A and the lens B.

The inequality (6) means the ratio of a distance from the most object-side lens surface of the first lens unit L1 to the most image-side lens surface of the first lens unit L1 to a distance from the most object-side lens surface of the entire system to the paraxial imaging plane at the wide angle end. When the value exceeds the upper limit value, the distance from the most object-side lens surface of the first lens unit L1 to the most image-side lens surface of the first lens unit L1 is too long, so the distance from the aperture stop SP to a first lens (lens disposed on the most object side) extends. As a result, the size of the first lens increases. When the value is lower than the lower limit value, the distance from the most object-side lens surface of the entire system to the paraxial imaging plane at the wide angle end is too long, so the size of the zoom lens L0 increases.

The inequality (7) means a distortion rate at the wide angle end. The ideal image height y0 is a value obtained from f×tan θ where the focal length of the entire system at the wide angle end is f and an angle formed between an optical axis and ray that enters from the object side associated with the maximum real image height y to the most object side of the entire system (half view angle) is θ. The real image height y can be determined by the maximum radius of an image circle of the zoom lens L0. When the value exceeds the upper limit value, the refractive power in the first lens unit L1 needs to be lowered to reduce the absolute value of the distortion rate, so the distance from the most object-side lens surface to the image plane IP extends, with the result that the size of the zoom lens L0 tends to increase. When the value is lower than the lower limit value, the absolute value of the distortion rate is too large, so a peripheral portion of an image is compressed by a large amount, with the result that it is difficult to obtain a sufficiently high-quality image.

The inequality (8) means the ratio of the focal length of the first lens unit L1 to the focal length of the entire system at the wide angle end. When the value exceeds the upper limit value, the absolute value of the focal length of the first lens unit L1 is too short, so the refractive power is too high, with the result that the astigmatism, field curvature, and lateral chromatic aberration at the wide angle end undesirably increase. When the value is lower than the lower limit value, the absolute value of the focal length of the first lens unit L1 is too long, so the distance from the most object-side lens surface to the image plane IP extends, and the size increases.

The inequality (9) means the ratio of the focal length of the negative lens A to the focal length of the entire system at the wide angle end. When the value exceeds the upper limit value, the absolute value of the focal length of the negative lens A is too short, so the refractive power is too high, with the result that particularly the lateral chromatic aberration at the wide angle end increases. When the value is lower than the lower limit value, the absolute value of the focal length of the negative lens A is too long, so the distance from the most object-side lens surface to the image plane IP extends, with the result that the diameter of the negative lens A increases.

The inequality (10) means the ratio of the focal length of the lens B to the focal length of the entire system at the wide angle end. When the value exceeds the upper limit value, the absolute value of the focal length of the lens B is too short, so the refractive power is too high, with the result that particularly the astigmatism and lateral chromatic aberration at the wide angle end increase. When the value is lower than the lower limit value, the absolute value of the focal length of the lens B is too long, so the distance from the most object-side lens surface to the image plane IP extends, with the result that the diameter of the lens B increases.

The inequality (11) means a zoom ratio. When the value exceeds the upper limit value, the amount of movement of each lens unit tends to increase, so the size of the zoom lens L0 tends to increase to ensure space for movement. When the value is lower than the lower limit value, the zoom ratio is too small, so it is difficult to exert a sufficient function as a zoom lens.

At least one of the upper limit value and the lower limit value of each of the inequalities (3) to (11) is more preferably set as the following numeric ranges.

$$1.82 < NdB \tag{3a}$$

$$2.3 < d/fw < 10 \tag{4a}$$

$$2.0 < d2/fw < 4.0 \tag{5a}$$

$$0.17 < GL/TL < 0.27 \tag{6a}$$

$$-19 < 100 \times (y - y0)/y0 < -11 \tag{7a}$$

$$-2.0 < f1/fw < -1.0 \tag{8a}$$

$$-3.1 < fa/fw < -1.7 \tag{9a}$$

$$-3.0 < fb/fw < -1.0 \tag{10a}$$

$$1.3 < ft/fw < 2.0 \tag{11a}$$

At least one of the upper limit value and the lower limit value of each of the inequalities (3) to (11) is further preferably set as the following numeric ranges.

$$1.84 < NdB \tag{3b}$$

$$2.7 < d/fw < 5 \tag{4b}$$

$$2.3 < d2/fw < 3.5 \tag{5b}$$

$$0.19 < GL/TL < 0.24 \tag{6b}$$

$$-18 < 100 \times (y-y0)/y0 < -14 \tag{7b}$$

$$-1.8 < f1/fw < -1.2 \tag{8b}$$

$$-2.8 < fa/fw < -1.9 \tag{9b}$$

$$-2.7 < fb/fw < -1.2 \tag{10b}$$

$$1.4 < ft/fw < 1.9 \tag{11b}$$

Next, the detailed configuration of the zoom lens L0 according to each embodiment will be described.

First Embodiment

The zoom lens L0 of the first embodiment includes a first lens unit L1 having a negative refractive power, a second lens unit L2 having a positive refractive power, a third lens unit L3 having a negative refractive power, a fourth lens unit L4 having a positive refractive power, and a fifth lens unit L5 having a positive refractive power, disposed in order from the object side toward the image side. By alternately arranging a lens unit having a negative refractive power and a lens unit having a positive refractive power, a lateral chromatic aberration and a longitudinal chromatic aberration are appropriately corrected. By setting the fifth lens unit L5 having a positive refractive power, back focus is ensured with a wide view angle, it is possible to reduce ghost images due to unnecessary light reflected between the image plane IP (or a low-pass filter or an IR cut filter that can be disposed on the object side) and the fifth lens unit L5. The configuration to move the third lens unit L3 in focusing is adopted, and the third lens unit L3 has a concentric shape such that the object side of the third lens unit L3 has a concave surface facing the aperture stop SP. Thus, even when the third lens unit L3 moves in focusing, fluctuations in field curvature and astigmatism are reduced, so high performance is obtained over the entire screen. When the third lens unit L3 is made up of two lenses, that is, a positive lens and a negative lens, fluctuations in lateral chromatic aberration and longitudinal chromatic aberration are reduced even when the lenses are moved in an optical axis direction.

The locus of the first lens unit L1 at the time of zooming monotonously shifts toward the image side from the wide angle end to the telephoto end. Thus, the absolute value of the focal length of the first lens unit L1 is extended (the refractive power is reduced) to provide high performance of the zoom lens L0.

Second Embodiment

A second embodiment differs from the first embodiment in that the third lens unit L3 that is a focusing unit is made up of a single negative lens. Thus, the size of the third lens unit L3 that moves at the time of focusing is reduced.

Third Embodiment

The zoom lens L0 according to a third embodiment includes a first lens unit L1 having a negative refractive power, a second lens unit L2 having a positive refractive power, a third lens unit L3 having a negative refractive power, a fourth lens unit L4 having a negative refractive power, and a fifth lens unit L5 having a positive refractive power, disposed in order from the object side toward the image side. By setting the fourth lens unit L4 having a negative refractive power, a lateral chromatic aberration that occurs in the fifth lens unit L5 having a positive refractive power is favorably corrected. By disposing a positive lens on the most object side, a negative distortion aberration that occurs in the first lens unit L1 is reduced to reduce a distortion rate, with the result that the compression ratio of a screen peripheral region is reduced to increase resolving power.

By joining the fourth lens unit L4 with the fifth lens unit L5, the intensity of unnecessary light that reflects between the fourth lens unit L4 and the fifth lens unit L5 is reduced to reduce ghost images.

By moving the fifth lens unit L5 toward the object side at the telephoto end, the fifth lens unit L5 is able to be disposed at a location at which off-axis ray height at the telephoto end is low, and the size is reduced.

Fourth Embodiment

The zoom lens L0 according to a fourth embodiment includes a first lens unit L1 having a negative refractive power, a second lens unit L2 having a positive refractive power, a third lens unit L3 having a positive refractive power, a fourth lens unit L4 having a negative refractive power, a fifth lens unit L5 having a positive refractive power, and a sixth lens unit L6 having a positive refractive power. The positive refractive power before and behind the aperture stop SP is divided as two lens units, and the two lens units are moved independently at the time of zooming. Thus, a spherical aberration and a coma aberration are favorably corrected in a wide zoom range.

Fifth Embodiment

The zoom lens L0 according to a fifth embodiment includes a first lens unit L1 having a negative refractive power, a second lens unit L2 having a positive refractive power, a third lens unit L3 having a negative refractive power, a fourth lens unit L4 having a positive refractive power, and a fifth lens unit L5 having a negative refractive power, arranged from the object side toward the image side. By setting the fourth lens unit L4 with a positive refractive power and setting the fifth lens unit L5 with a negative refractive power, a front principal point position in the combination of the fourth lens unit L4 and the fifth lens unit L5 is able to be moved to the object side, and back focus is able to be shortened, so the size of the zoom lens L0 is reduced.

Sixth Embodiment

The zoom lens L0 of a sixth embodiment includes a first lens unit L1 having a negative refractive power, a second lens unit L2 having a positive refractive power, a third lens unit L3 having a negative refractive power, and a fourth lens unit L4 having a positive refractive power, disposed in order from the object side toward the image side. By providing one of each of a positive lens and a negative lens in the fourth lens unit L4, a lateral chromatic aberration is favorably corrected within a wide zoom range.

The zoom lens L0 of each of the above-described embodiments may be used in an image capture apparatus having an image processing function to correct an aberration (a distortion aberration and a lateral chromatic aberration).

Hereinafter, first to sixth numerical embodiments respectively corresponding to the first to sixth embodiments will be described.

In surface data of each numerical embodiment, r denotes the radius of curvature of each optical surface, and d (mm) denotes an on-axis interval (distance on the optical axis) between an mth surface and an (m+1)th surface. Here, m is a number assigned to a surface and counted from a light incident side. nd denotes the refractive index of each optical member for d line, and vd denotes the Abbe number of the optical member. The Abbe number vd of a material is, where the refractive indexes for d line (587.6 nm), F line (486.1 nm), C line (656.3 nm), and g line (435.8 nm) of Fraunhofer's line are respectively Nd, NF, NC, Ng, expressed by $$vd = (Nd-1)/(NF-NC).$$

When the optical surface is an aspherical surface, the sign "*" is suffixed to the surface number. An aspherical shape is, where X is an amount of displacement from a surface vertex in the optical axis direction, h is a height from the optical axis in a direction perpendicular to the optical axis, R is a paraxial radius of curvature, k is a conic constant, and A4, A6, A8, A10, A12, . . . are aspherical coefficients for respective degrees, expressed by $$x = (h^2/R)/[1 + \{1 - (1k)(h/R)^2\}^{1/2}] + A4 \times h^4 + A6 \times h^6 + A8 \times h^8 + A10 \times h^{10}.$$

In each aspherical coefficient, "e±XX" means "$\times 10^{\pm XX}$".

First Numerical Embodiment

Unit mm

Surface Data

| Surface Number | r | d | nd | vd | Effective Diameter |
|---|---|---|---|---|---|
| 1 | 45.932 | 1.80 | 2.00100 | 29.1 | 36.70 |
| 2 | 19.277 | 7.27 | | | 29.17 |
| 3 | 81.393 | 1.40 | 1.84943 | 42.6 | 27.28 |
| 4 | 20.862 | 6.78 | | | 24.31 |
| 5 | -32.534 | 1.30 | 1.49700 | 81.5 | 24.21 |
| 6 | 39.245 | 0.34 | | | 25.06 |
| 7 | 36.818 | 6.92 | 1.78582 | 36.7 | 25.39 |
| 8 | -45.455 | (Variable) | | | 25.35 |
| 9 | 46.667 | 1.80 | 1.60738 | 56.8 | 11.23 |
| 10 | ∞ | 3.00 | | | 10.63 |
| 11 | (Aperture) | ∞ | 3.00 | | 10.34 |
| 12 | 88.981 | 1.00 | 1.80400 | 46.5 | 10.34 |
| 13 | 19.604 | 2.53 | 1.71300 | 53.9 | 10.25 |
| 14 | -123.595 | 2.00 | | | 10.21 |
| 15 | 16.661 | 2.78 | 1.51633 | 64.1 | 10.41 |
| 16 | 47.619 | 4.87 | | | 10.69 |
| 17 | 34.510 | 1.00 | 1.90043 | 37.4 | 12.26 |
| 18 | 11.580 | 5.34 | 1.49700 | 81.5 | 12.24 |
| 19 | -36.852 | (Variable) | | | 13.26 |
| 20 | -26.584 | 3.17 | 1.77250 | 49.6 | 14.02 |
| 21 | -13.000 | 1.10 | 1.85107 | 36.9 | 14.79 |
| 22 | -225.385 | (Variable) | | | 16.29 |

-continued

Unit mm

| | | | | | |
|---|---|---|---|---|---|
| 23* | -50.000 | 3.00 | 1.53110 | 55.9 | 21.52 |
| 24* | -34.796 | (Variable) | | | 23.70 |
| 25 | -157.498 | 4.50 | 1.79008 | 48.6 | 36.60 |
| 26 | -45.000 | 13.50 | | | 37.47 |
| Image Plane | ∞ | | | | |

Aspherical Surface Data

23rd Surface

K = 0.00000e+000 A4 = -7.50939e-005 A6 = 6.59902e-007
A8 = -4.44635e-009 A10 = 1.37303e-011

24th Surface

K = 0.00000e+000 A4 = -3.09530e-005 A6 = 4.44991e-007
A8 = -1.75524e-009 A10 = 4.51720e-012

Various Data

| Zoom Ratio | 1.89 |
|---|---|

| | Wide Angle | Middle | Telephoto |
|---|---|---|---|
| Focal Length | 15.45 | 20.34 | 29.15 |
| F-number | 4.60 | 5.25 | 6.32 |
| Half View Angle (°) | 49.36 | 44.61 | 36.19 |
| Image Height | 18.00 | 20.06 | 21.33 |
| Overall Lens Length | 115.26 | 109.84 | 107.01 |
| BF | 13.50 | 13.50 | 13.50 |
| d8 | 25.18 | 13.47 | 1.21 |
| d19 | 2.67 | 3.30 | 5.13 |
| d22 | 7.82 | 7.19 | 5.36 |
| d24 | 1.20 | 7.49 | 16.92 |
| Entrance Pupil Position | 17.00 | 15.69 | 13.74 |
| Exit Pupil Position | -64.71 | -86.93 | -130.67 |
| Front Principal Point Position | 29.40 | 31.91 | 37.00 |
| Rear Principal Point Position | -1.95 | -6.84 | -15.65 |

Zoom Lens Unit Data

| Unit | Starting Surface | Focal Length | Lens Structure Length | Front Principal Point Position | Rear Principal Point Position |
|---|---|---|---|---|---|
| 1 | 1 | -25.31 | 25.82 | -0.46 | -26.81 |
| 2 | 9 | 24.31 | 27.31 | 9.72 | -14.84 |
| 3 | 20 | -31.88 | 4.27 | 0.06 | -2.33 |
| 4 | 23 | 201.66 | 3.00 | 6.03 | 4.20 |
| 5 | 25 | 78.36 | 4.50 | 3.46 | 0.99 |

Single Lens Element Data

| Lens | Starting Surface | Focal Length |
|---|---|---|
| 1 | 1 | -34.34 |
| 2 | 3 | -33.38 |
| 3 | 5 | -35.58 |
| 4 | 7 | 26.88 |
| 5 | 9 | 76.83 |
| 6 | 12 | -31.48 |
| 7 | 13 | 23.91 |
| 8 | 15 | 48.16 |
| 9 | 17 | -19.76 |
| 10 | 18 | 18.40 |
| 11 | 20 | 29.90 |
| 12 | 21 | -16.25 |
| 13 | 23 | 201.66 |
| 14 | 25 | 78.36 |

Second Numerical Embodiment

| Unit mm | | | | |
|---|---|---|---|---|
| | | Surface Data | | |

| Surface Number | r | d | nd | vd | Effective Diameter |
|---|---|---|---|---|---|
| 1 | 39.485 | 1.80 | 2.00100 | 29.1 | 35.98 |
| 2 | 19.277 | 6.35 | | | 29.06 |
| 3 | 81.393 | 1.40 | 1.90043 | 37.4 | 27.89 |
| 4 | 21.695 | 6.53 | | | 24.75 |
| 5 | −37.674 | 1.30 | 1.49700 | 81.5 | 24.58 |
| 6 | 45.445 | 1.55 | | | 24.80 |
| 7 | 48.066 | 6.33 | 1.80610 | 33.3 | 25.36 |
| 8 | −58.121 | (Variable) | | | 25.19 |
| 9 | 75.709 | 2.91 | 1.63930 | 44.9 | 12.62 |
| 10 | −99.071 | 5.00 | | | 11.75 |
| 11 | (Aperture) | ∞ | 3.00 | | 10.25 |
| 12 | 90.807 | 1.00 | 1.80400 | 46.5 | 10.20 |
| 13 | 21.203 | 2.41 | 1.71300 | 53.9 | 10.11 |
| 14 | −125.965 | 2.00 | | | 10.05 |
| 15 | 14.434 | 3.39 | 1.48749 | 70.2 | 10.46 |
| 16 | 47.619 | 3.38 | | | 10.70 |
| 17 | 40.616 | 1.00 | 1.90043 | 37.4 | 11.54 |
| 18 | 10.473 | 5.52 | 1.49700 | 81.5 | 11.52 |
| 19 | −36.785 | (Variable) | | | 12.72 |
| 20 | −24.105 | 1.10 | 1.80100 | 35.0 | 14.79 |
| 21 | −332.736 | (Variable) | | | 15.94 |
| 22* | −50.000 | 3.00 | 1.53110 | 55.9 | 21.21 |
| 23* | −33.834 | (Variable) | | | 23.27 |
| 24 | −186.603 | 4.91 | 1.80400 | 46.5 | 37.46 |
| 25 | −45.000 | 13.50 | | | 38.41 |
| Image Plane | ∞ | | | | |

| Aspherical Surface Data |
|---|
| 22nd Surface |

K = 0.00000e+000 A4 = −3.17244e−005 A6 = 2.39294e−007
A8 = −2.65521e−009 A10 = 1.39956e−011

| 23rd Surface |
|---|

K = 0.00000e+000 A4 = −7.78280e−006 A6 = 1.77889e−007
A8 = −9.23774e−010 A10 =4.78158e−012

| Various Data | | | |
|---|---|---|---|
| Zoom Ratio | | 1.89 | |

| | Wide Angle | Middle | Telephoto |
|---|---|---|---|
| Focal Length | 15.45 | 20.53 | 29.15 |
| F-number | 4.60 | 5.27 | 6.36 |
| Half View Angle (°) | 49.88 | 45.31 | 36.58 |
| Image Height | 18.34 | 20.75 | 21.63 |
| Overall Lens Length | 115.28 | 109.06 | 106.60 |
| BF | 13.50 | 13.50 | 13.50 |
| d8 | 24.84 | 12.64 | 1.20 |
| d19 | 2.86 | 4.14 | 6.51 |
| d21 | 9.00 | 7.72 | 5.35 |
| d23 | 1.20 | 7.19 | 16.16 |
| Entrance Pupil Position | 17.59 | 16.29 | 14.57 |
| Exit Pupil Position | −64.63 | −84.63 | −125.12 |
| Front Principal Point Position | 29.98 | 32.52 | 37.59 |
| Rear Principal Point Position | −1.95 | −7.03 | −15.65 |

| Zoom Lens Unit Data | | | | | |
|---|---|---|---|---|---|
| Unit | Starting Surface | Focal Length | Lens Structure Length | Front Principal Point Position | Rear Principal Point Position |
| 1 | 1 | −24.39 | 25.25 | 0.53 | −24.54 |
| 2 | 9 | 24.70 | 29.61 | 10.23 | −15.77 |
| 3 | 20 | −32.50 | 1.10 | −0.05 | −0.66 |

-continued

| Unit mm | | | | | |
|---|---|---|---|---|---|
| 4 | 22 | 185.12 | 3.00 | 5.69 | 3.85 |
| 5 | 24 | 72.63 | 4.91 | 3.53 | 0.85 |

| Single Lens Element Data | | |
|---|---|---|
| Lens | Starting Surface | Focal Length |
| 1 | 1 | −39.38 |
| 2 | 3 | −33.22 |
| 3 | 5 | −41.23 |
| 4 | 7 | 33.53 |
| 5 | 9 | 67.57 |
| 6 | 12 | −34.63 |
| 7 | 13 | 25.63 |
| 8 | 15 | 41.11 |
| 9 | 17 | 15.92 |
| 10 | 18 | 17.06 |
| 11 | 20 | −32.50 |
| 12 | 22 | 185.12 |
| 13 | 24 | 72.63 |

Third Numerical Embodiment

| Unit mm | | | | | |
|---|---|---|---|---|---|
| | | Surface Data | | | |

| Surface Number | r | d | nd | vd | Effective Diameter |
|---|---|---|---|---|---|
| 1 | 52.248 | 2.62 | 1.51633 | 64.1 | 28.75 |
| 2 | 140.000 | 0.15 | | | 26.67 |
| 3 | 26.292 | 0.80 | 1.90043 | 37.4 | 20.18 |
| 4 | 10.697 | 3.20 | | | 15.85 |
| 5 | 60.521 | 0.80 | 1.95375 | 32.3 | 15.54 |
| 6 | 10.056 | 3.71 | | | 13.19 |
| 7 | −25.717 | 0.80 | 1.49700 | 81.5 | 13.14 |
| 8 | 14.607 | 4.06 | 1.90366 | 31.3 | 13.41 |
| 9 | −55.225 | (Variable) | | | 13.10 |
| 10 | −101.139 | 2.20 | 1.48749 | 70.2 | 7.88 |
| 11 | −21.879 | 2.89 | | | 8.23 |
| 12 | (Aperture) | ∞ | 1.75 | | 8.52 |
| 13 | 13.538 | 5.13 | 1.48749 | 70.2 | 8.74 |
| 14 | −10.601 | 1.00 | 1.77250 | 49.6 | 8.16 |
| 15 | −22.350 | 3.58 | | | 8.16 |
| 16 | 20.040 | 0.70 | 1.90043 | 37.4 | 9.69 |
| 17 | 8.853 | 4.71 | 1.49700 | 81.5 | 9.63 |
| 18 | −21.100 | (Variable) | | | 10.46 |
| 19 | −19.295 | 0.70 | 1.91082 | 35.3 | 10.75 |
| 20 | −100.891 | (Variable) | | | 11.26 |
| 21* | −24.999 | 1.50 | 1.53110 | 55.9 | 14.14 |
| 22* | −26.775 | (Variable) | | | 15.39 |
| 23 | −182.094 | 4.42 | 1.60311 | 60.6 | 18.76 |
| 24 | −22.000 | (Variable) | | | 20.18 |
| Image Plane | ∞ | | | | |

| Aspherical Surface Data |
|---|
| 21st Surface |

K = 0.00000e+000 A4 = −1.91538e−004 A6 = 5.07567e−006
A8 = −8.17417e−008 A10 = 5.32571e−010

| 22nd Surface |
|---|

K = 0.00000e+000 A4 = −6.30674e−005 A6 = 4.22634e−006
A8 = −5.18522e−008 A10 = 2.90202e−010

-continued

Unit mm

Various Data

| Zoom Ratio | | 1.47 | |
|---|---|---|---|

| | Wide Angle | Middle | Telephoto |
|---|---|---|---|
| Focal Length | 9.97 | 12.66 | 14.64 |
| F-number | 3.50 | 3.94 | 4.23 |
| Half View Angle (°) | 49.63 | 44.83 | 41.54 |
| Image Height | 11.72 | 12.58 | 12.97 |
| Overall Lens Length | 72.73 | 71.60 | 71.78 |
| BF | 10.06 | >12.25 | 14.3 |
| d9 | 10.09 | 4.76 | 1.89 |
| d18 | 1.44 | 2.18 | 2.76 |
| d20 | 5.42 | 4.68 | 4.11 |
| d22 | 0.99 | 3.00 | 4.00 |
| d24 | 10.06 | 12.25 | 14.31 |
| Entrance Pupil Position | 11.15 | 10.50 | 10.06 |
| Exit Pupil Position | −51.09 | −59.37 | −63.10 |
| Front Principal Point Position | 19.49 | 20.92 | 21.93 |
| Rear Principal Point Position | 0.09 | −0.40 | −0.33 |

Zoom Lens Unit Data

| Unit | Starting Surface | Focal Length | Lens Structure Length | Front Principal Point Position | Rear Principal Point Position |
|---|---|---|---|---|---|
| 1 | 1 | −12.21 | 16.14 | 2.87 | −11.14 |
| 2 | 10 | 15.46 | 21.97 | 9.98 | −10.48 |
| 3 | 19 | −26.30 | 0.70 | −0.09 | −0.45 |
| 4 | 21 | −1004.27 | 1.50 | −19.52 | −20.90 |
| 5 | 23 | 41.06 | 4.42 | 3.10 | 0.37 |

Single Lens Element Data

| Lens | Starting Surface | Focal Length |
|---|---|---|
| 1 | 1 | 159.82 |
| 2 | 3 | −20.53 |
| 3 | 5 | −12.74 |
| 4 | 7 | −18.62 |
| 5 | 8 | 13.15 |
| 6 | 10 | 56.75 |
| 7 | 13 | 13.11 |
| 8 | 14 | −27.11 |
| 9 | 16 | −18.15 |
| 10 | 17 | 13.24 |
| 11 | 19 | −26.30 |
| 12 | 21 | −1004.27 |
| 13 | 23 | 41.06 |

Fourth Numerical Embodiment

Unit mm

Surface Data

| Surface Number | r | d | nd | vd | Effective Diameter |
|---|---|---|---|---|---|
| 1 | 40.925 | 1.80 | 2.05090 | 26.9 | 33.27 |
| 2 | 21.334 | 4.87 | | | 27.89 |
| 3 | 79.995 | 1.40 | 1.95375 | 32.3 | 26.78 |
| 4 | 24.034 | 4.47 | | | 23.95 |
| 5 | −91.221 | 1.30 | 1.49700 | 81.5 | 23.68 |
| 6 | 31.289 | 2.00 | | | 22.62 |
| 7 | 59.784 | 3.91 | 1.82097 | 22.5 | 22.63 |
| 8 | −85.008 | (Variable) | | | 22.27 |
| 9 | 100.000 | 1.00 | 1.63980 | 34.5 | 9.42 |
| 10 | 20.000 | 2.47 | 1.88645 | 38.8 | 9.51 |
| 11 | −90.366 | 3.00 | | | 9.49 |

-continued

Unit mm

| 12 | (Aperture) | ∞ | (Variable) | | 9.12 |
|---|---|---|---|---|---|
| 13 | 15.735 | 3.66 | 1.52647 | 69.8 | 11.78 |
| 14 | −17.484 | 0.59 | | | 11.90 |
| 15 | −16.171 | 1.00 | 1.90043 | 37.4 | 11.76 |
| 16 | 44.055 | 5.10 | 1.49700 | 81.5 | 12.35 |
| 17 | −13.352 | (Variable) | | | 13.43 |
| 18 | −14.286 | 1.10 | 1.87587 | 39.9 | 13.46 |
| 19 | −74.875 | (Variable) | | | 14.64 |
| 20 | 5903.921 | 2.85 | 1.49700 | 81.5 | 19.07 |
| 21* | −33.757 | (Variable) | | | 20.14 |
| 22 | −98.558 | 3.58 | 1.80400 | 46.5 | 26.77 |
| 23 | −45.000 | (Variable) | | | 28.10 |
| Image Plane | ∞ | | | | |

Aspherical Surface Data
21st Surface

K = 0.00000e+000 A4 = 6.79219e−005 A6 = 1.06797e−007
A8 = 1.34694e−009 A10 = −5.68552e−012

Various Data

| Zoom Ratio | | 1.82 | |
|---|---|---|---|

| | Wide Angle | Middle | Telephoto |
|---|---|---|---|
| Focal Length | 16.00 | 20.22 | 29.17 |
| F-number | 4.60 | 4.97 | 5.66 |
| Half View Angle (°) | 48.58 | 45.05 | 36.57 |
| Image Height | 18.14 | 20.26 | 21.64 |
| Overall Lens Length | 99.94 | 95.51 | 91.54 |
| BF | 13.04 | 19.20 | 30.42 |
| d8 | 22.55 | 12.93 | 1.20 |
| d12 | 4.71 | 4.81 | 4.91 |
| d17 | 2.26 | 2.44 | 3.69 |
| d19 | 5.43 | 4.78 | 3.15 |
| d21 | 7.84 | 7.24 | 4.07 |
| d23 | 13.04 | 19.20 | 30.42 |
| Entrance Pupil Position | 17.09 | 15.78 | 13.40 |
| Exit Pupil Position | −53.81 | −50.02 | −38.59 |
| Front Principal Point Position | 29.26 | 30.09 | 30.24 |
| Rear Principal Point Position | −2.96 | −1.02 | 1.25 |

Zoom Lens Unit Data

| Unit | Starting Surface | Focal Length | Lens Structure Length | Front Principal Point Position | Rear Principal Point Position |
|---|---|---|---|---|---|
| 1 | 1 | −22.38 | 19.75 | 2.35 | −15.16 |
| 2 | 9 | 35.44 | 6.47 | 0.93 | −4.01 |
| 3 | 13 | 27.72 | 10.35 | 4.14 | −3.77 |
| 4 | 18 | −20.33 | 1.10 | −0.14 | −0.73 |
| 5 | 20 | 67.55 | 2.85 | 1.89 | −0.01 |
| 6 | 22 | 100.02 | 3.58 | 3.55 | 1.62 |

Single Lens Element Data

| Lens | Starting Surface | Focal Length |
|---|---|---|
| 1 | 1 | −44.50 |
| 2 | 3 | −36.47 |
| 3 | 5 | −46.71 |
| 4 | 7 | 43.28 |
| 5 | 9 | −39.27 |
| 6 | 10 | 18.67 |
| 7 | 13 | 16.35 |
| 8 | 15 | −13.03 |
| 9 | 16 | 21.24 |
| 10 | 18 | −20.33 |
| 11 | 20 | 67.55 |
| 12 | 22 | 100.02 |

Fifth Numerical Embodiment

Unit mm

Surface Data

| Surface Number | r | d | nd | vd | Effective Diameter |
|---|---|---|---|---|---|
| 1 | 50.254 | 1.80 | 2.05090 | 26.9 | 36.85 |
| 2 | 19.398 | 6.82 | | | 29.33 |
| 3 | 135.195 | 1.40 | 1.95375 | 32.3 | 28.56 |
| 4 | 30.089 | 5.41 | | | 26.58 |
| 5 | −47.967 | 1.30 | 1.49700 | 81.5 | 26.52 |
| 6 | 37.077 | 0.19 | | | 27.13 |
| 7 | 35.891 | 7.61 | 1.82283 | 30.8 | 27.32 |
| 8 | −62.958 | (Variable) | | | 27.08 |
| 9 | 100.000 | 1.00 | 1.53458 | 47.9 | 10.67 |
| 10 | 20.000 | 2.47 | 1.84733 | 42.8 | 10.74 |
| 11 | −7293.532 | 3.20 | | | 10.64 |
| 12 | (Aperture) | ∞ | 6.70 | | 10.31 |
| 13 | 20.310 | 3.45 | 1.56657 | 68.8 | 11.12 |
| 14 | −23.439 | 0.77 | | | 11.40 |
| 15 | −17.148 | 1.00 | 1.90043 | 37.4 | 11.36 |
| 16 | 58.384 | 4.41 | 1.49700 | 81.5 | 12.04 |
| 17 | −15.093 | (Variable) | | | 13.17 |
| 18 | −22.042 | 1.10 | 1.85000 | 35.0 | 14.06 |
| 19 | −73.968 | (Variable) | | | 14.82 |
| 20* | 123.352 | 4.61 | 1.51380 | 54.6 | 21.29 |
| 21* | −32.035 | (Variable) | | | 22.35 |
| 22 | −43.536 | 1.50 | 1.88449 | 39.0 | 23.28 |
| 23 | −87.118 | (Variable) | | | 24.42 |
| Image Plane | ∞ | | | | |

Aspherical Surface Data

20th Surface

K = 0.00000e+000 A4 = 7.78121e−006 A6 = −1.41841e−007
A8 = 1.32693e−009 A10 = −7.58503e−012

21st Surface

K = 0.00000e+000 A4 = 4.93770e−005 A6 = −4.36212e−008
A8 = 1.50692e−009 A10 = −6.87281e−012

Various Data

| Zoom Ratio | | 1.88 | |
|---|---|---|---|
| | Wide Angle | Middle | Telephoto |
| Focal Length | 15.53 | 20.47 | 29.15 |
| F-number | 4.60 | 5.01 | 5.59 |
| Half View Angle (°) | 49.20 | 43.44 | 35.66 |
| Image Height | 18.00 | 19.38 | 20.92 |
| Overall Lens Length | 120.00 | 109.11 | 99.49 |
| BF | 15.70 | 23.59 | 24.20 |
| d8 | 32.68 | 17.17 | 1.20 |
| d17 | 4.32 | 4.50 | 5.63 |
| d19 | 10.14 | 6.17 | 3.93 |
| d21 | 2.40 | 2.92 | 9.77 |
| d23 | 15.70 | 23.59 | 24.20 |
| Entrance Pupil Position | 17.77 | 16.10 | 13.44 |
| Exit Pupil Position | −40.00 | −33.43 | −33.85 |
| Front Principal Point Position | 28.97 | 29.22 | 27.95 |
| Rear Principal Point Position | 0.16 | 3.13 | −4.95 |

Zoom Lens Unit Data

| Unit | Starting Surface | Focal Length | Lens Structure Length | Front Principal Point Position | Rear Principal Point Position |
|---|---|---|---|---|---|
| 1 | 1 | −26.49 | 24.53 | −0.82 | −23.99 |
| 2 | 9 | 25.34 | 23.00 | 10.82 | −11.53 |
| 3 | 18 | −37.30 | 1.10 | −0.25 | −0.86 |

-continued

Unit mm

| 4 | 20 | 50.00 | 4.61 | 2.44 | −0.63 |
|---|---|---|---|---|---|
| 5 | 22 | −100.01 | 1.50 | −0.81 | −1.62 |

Single Lens Element Data

| Lens | Starting Surface | Focal Length |
|---|---|---|
| 1 | 1 | −30.99 |
| 2 | 3 | −40.84 |
| 3 | 5 | −41.86 |
| 4 | 7 | 28.78 |
| 5 | 9 | −46.97 |
| 6 | 10 | 23.54 |
| 7 | 13 | 19.77 |
| 8 | 15 | −14.63 |
| 9 | 16 | 24.62 |
| 10 | 18 | −37.30 |
| 11 | 20 | 50.00 |
| 12 | 22 | −100.01 |

Sixth Numerical Embodiment

Unit mm

Surface Data

| Surface Number | r | d | nd | vd | Effective Diameter |
|---|---|---|---|---|---|
| 1 | 46.382 | 1.80 | 2.05090 | 26.9 | 36.85 |
| 2 | 19.375 | 6.91 | | | 29.33 |
| 3 | 148.313 | 1.40 | 1.95375 | 32.3 | 28.56 |
| 4 | 28.489 | 5.81 | | | 26.58 |
| 5 | −43.395 | 1.30 | 1.49700 | 81.5 | 26.52 |
| 6 | 35.729 | 0.20 | | | 27.13 |
| 7 | 35.165 | 8.11 | 1.79522 | 32.0 | 27.32 |
| 8 | −51.640 | (Variable) | | | 27.08 |
| 9 | 100.000 | 1.00 | 1.51753 | 52.4 | 10.67 |
| 10 | 20.000 | 2.47 | 1.82588 | 45.0 | 10.74 |
| 11 | −7234.968 | 3.06 | | | 10.64 |
| 12 | (Aperture) | ∞ | 7.94 | | 10.31 |
| 13 | 20.503 | 3.02 | 1.56724 | 64.1 | 11.12 |
| 14 | −21.985 | 0.74 | | | 11.40 |
| 15 | −16.908 | 1.00 | 1.90043 | 37.4 | 11.36 |
| 16 | 58.603 | 4.42 | 1.49700 | 81.5 | 12.04 |
| 17 | −15.011 | (Variable) | | | 13.17 |
| 18 | −23.876 | 1.10 | 1.85000 | 35.0 | 14.06 |
| 19 | −82.849 | (Variable) | | | 14.82 |
| 20* | 112.899 | 3.87 | 1.49967 | 65.6 | 21.29 |
| 21* | −32.833 | 2.02 | | | 22.35 |
| 22 | −40.113 | 1.50 | 1.75377 | 52.3 | 23.28 |
| 23 | −87.118 | (Variable) | | | 24.42 |
| Image Plane | ∞ | | | | |

Aspherical Surface Data

20th Surface

K = 0.00000e+000 A4 = 8.69555e−006 A6 = −1.43147e−007
A8 = 1.23812e−009 A10 = −8.16964e−012

21st Surface

K = 0.00000e+000 A4 = 4.80363e−005 A6 = −4.52567e−008
A8 = 1.32395e−009 A10 = −7.40260e−012

Various Data

| Zoom Ratio | | 1.87 | |
|---|---|---|---|
| | Wide Angle | Middle | Telephoto |
| Focal Length | 15.60 | 19.00 | 29.15 |
| F-number | 4.54 | 4.86 | 5.73 |

-continued

| Unit mm | | | |
|---|---|---|---|
| Half View Angle (°) | 49.09 | 44.98 | 35.72 |
| Image Height | 18.00 | 18.99 | 20.96 |
| Overall Lens Length | 120.00 | 112.82 | 104.38 |
| BF | 18.33 | 24.39 | 34.47 |
| d8 | 30.79 | 19.62 | 1.20 |
| d17 | 2.82 | 2.53 | 3.93 |
| d19 | 10.38 | 8.60 | 7.10 |
| d23 | 18.33 | 24.39 | 34.47 |
| Entrance Pupil Position | 17.79 | 16.60 | 13.71 |
| Exit Pupil Position | −40.00 | −36.67 | −35.07 |
| Front Principal Point Position | 29.21 | 29.69 | 30.64 |
| Rear Principal Point Position | 2.73 | 5.39 | 5.32 |

| Zoom Lens Unit Data | | | | | |
|---|---|---|---|---|---|
| Unit | Starting Surface | Focal Length | Lens Structure Length | Front Principal Point Position | Rear Principal Point Position |
| 1 | 1 | −27.61 | 25.54 | −1.42 | −26.70 |
| 2 | 9 | 25.57 | 23.66 | 12.00 | −11.67 |
| 3 | 18 | −39.80 | 1.10 | −0.24 | −0.84 |
| 4 | 20 | 101.68 | 7.39 | 0.11 | −5.31 |

| Single Lens Element Data | | |
|---|---|---|
| Lens | Starting Surface | Focal Length |
| 1 | 1 | −32.78 |
| 2 | 3 | −37.19 |
| 3 | 5 | −39.21 |
| 4 | 7 | 27.44 |
| 5 | 9 | −48.51 |
| 6 | 10 | 24.15 |
| 7 | 13 | 19.20 |
| 8 | 15 | −14.48 |
| 9 | 16 | 24.53 |
| 10 | 18 | −39.80 |
| 11 | 20 | 51.36 |
| 12 | 22 | −100.00 |

Various values in each embodiment are shown in the following table.

sensor and a CMOS sensor, that is incorporated in the camera body 10 and that receives and photoelectrically converts an optical image formed by the lens apparatus 11. The camera body 10 may be a so-called single-lens reflex camera that has a quick-turn mirror or may be a so-called mirrorless camera that has no quick-turn mirror.

In this way, by applying the zoom lens L0 according to the embodiments of the disclosure to the image capture apparatus, such as a digital still camera, it is possible to obtain a high-quality image with a low aberration and a reduced ghosting effect.

The embodiments of the disclosure have been described above; however, the disclosure is not limited to these embodiments. Various modifications and changes are possible within the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-176783 filed Oct. 28, 2021, which is hereby incorporated by reference herein in its entirety.

What is claimed is:

1. A zoom lens comprising:
   a first lens unit having a negative refractive power;
   a second lens unit having a positive refractive power; and
   a rear group including two or more lens units, wherein
   the first lens unit, the second lens unit, and the rear group are disposed in order from an object side toward an image side,
   wherein a total number of lens units arranged in the zoom lens is five or more,
   in zooming, the first lens unit is arranged to move, and each interval between adjacent lens units changes,
   the rear group includes all lens units arranged on the image side of the second lens unit in the zoom lens,

TABLE 1

| | INEQUALITY | FIRST EMBODIMENT | SECOND EMBODIMENT | THIRD EMBODIMENT | FOURTH EMBODIMENT | FIFTH EMBODIMENT | SIXTH EMBODIMENT |
|---|---|---|---|---|---|---|---|
| (1) | $2 < Ra/Da < 100$ | 2.65 | 3.04 | 3.34 | 4.38 | 2.84 | 2.80 |
| (2) | $10 < Rb/Db < 100$ | 12.00 | 12.47 | 16.32 | 17.88 | 25.00 | 25.52 |
| (3) | $1.8 < NdB$ | 1.85 | 1.90 | 1.95 | 1.95 | 1.95 | 1.95 |
| (4) | $2 < d/fw < 15$ | 3.49 | 3.64 | 2.78 | 2.94 | 4.00 | 3.91 |
| (5) | $1.5 < d2/fw < 5.0$ | 2.93 | 3.14 | 2.38 | 2.54 | 3.47 | 3.38 |
| (6) | $0.15 < GL/TL < 0.30$ | 0.22 | 0.22 | 0.22 | 0.20 | 0.20 | 0.21 |
| (7) | $-20 < 100*(y - y0)/y0 < -8$ | −17.22 | −15.24 | −14.18 | −16.16 | −16.81 | −17.46 |
| (8) | $-2.5 < f1/fw < -0.8$ | −1.64 | −1.58 | −1.23 | −1.40 | −1.71 | −1.77 |
| (9) | $-3.5 < fa/fw < -1.5$ | −2.22 | −2.55 | −2.06 | −2.78 | −1.99 | −2.10 |
| (10) | $-3.5 < fb/fw < -0.8$ | −2.16 | −2.15 | −1.28 | −2.28 | −2.63 | −2.38 |
| (11) | $1.2 < ft/fw < 2.1$ | 1.89 | 1.89 | 1.47 | 1.82 | 1.88 | 1.87 |

Image Capture Apparatus

Figure 13:
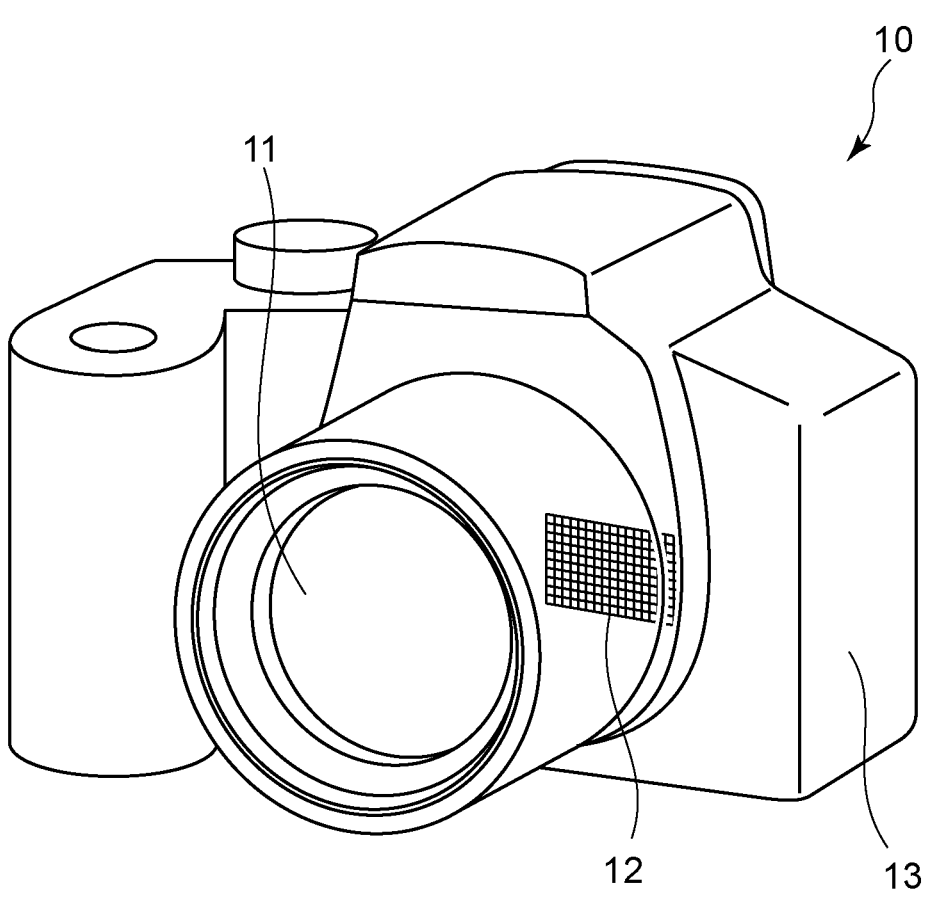
FIG. 13 is a schematic diagram showing an image capture apparatus.

Next, an embodiment of a digital still camera (image capture apparatus) using the zoom lens according to the embodiments of the disclosure will be described with reference to FIG. 13. In FIG. 13, reference sign 10 denotes a camera body, and reference sign 11 denotes a lens apparatus that includes the zoom lens L0 according to any one of the above-described first to sixth embodiments.

Reference sign 12 denotes a solid-state image pickup device (photoelectric conversion device), such as a CCD a refractive index of a negative lens A disposed closest to an object, among negative lenses included in the first lens unit, is greater than or equal to 1.89, and
the following inequalities are satisfied:

$$2.0 < Ra/Da < 100;$$

$$10 < Rb/Db < 100;$$

$$-3.5 < fa/fw < -1.5;$$

$$0.15 < GL/TL < 0.30; \text{ and}$$

$$-20 < 100 \times (y-y0)/y0 < -8$$

where a radius of curvature of an image-side lens surface of the negative lens A is Ra, a radius of curvature of an object-side lens surface of a lens B disposed adjacent to the image side of the negative lens A is Rb, an air gap between the negative lens A and the lens B is Da, an air gap between the lens B and a lens disposed adjacent to the image side of the lens B is Db, a focal length of the negative lens A is fa, a focal length of the zoom lens at a wide angle end is fw, a distance from a lens surface closest to the object, among lens surfaces of the first lens unit, to a lens surface closest to an image plane, among the lens surfaces of the first lens unit, is GL, a distance from a lens surface closest to the object, among lens surfaces of the zoom lens, to the image plane at the wide angle end is TL, a maximum real image height at the wide angle end is y, and an ideal image height with a maximum view angle of the zoom lens at the wide angle end is y0.

2. The zoom lens according to claim 1, wherein the following inequality is satisfied:

$$1.80 < NdB$$

where a refractive index of the lens B is NdB.

3. The zoom lens according to claim 1, further comprising an aperture stop, wherein the following inequality is satisfied:

$$2.0 < d/fw < 15$$

where a distance from the image-side lens surface of the negative lens A to the aperture stop at the wide angle end is d.

4. The zoom lens according to claim 1, further comprising an aperture stop, wherein the following inequality is satisfied:

$$1.5 < d2/fw < 5.0$$

where a distance from an image-side lens surface of the lens B to the aperture stop at the wide angle end is d2.

5. The zoom lens according to claim 1, wherein the following inequality is satisfied:

$$-2.5 < f1/fw < -0.8$$

where a focal length of the first lens unit is f1.

6. The zoom lens according to claim 1, wherein the lens B is a negative lens.

7. The zoom lens according to claim 6, wherein the following inequality is satisfied:

$$-3.5 < fb/fw < -0.8$$

where a focal length of the lens B is fb.

8. The zoom lens according to claim 1, wherein the following inequality is satisfied:

$$1.2 < ft/fw < 2.1$$

where a focal length of the zoom lens at a telephoto end is ft.

9. The zoom lens according to claim 1, wherein the first lens unit consists of three negative lenses and a positive lens disposed on the image side of the three negative lenses.

10. The zoom lens according to claim 1, further comprising a lens unit, having a positive refractive power, disposed closest to an image plane.

11. The zoom lens according to claim 1, further comprising a lens unit, having a negative refractive power, disposed closest to an image plane.

12. An image capture apparatus comprising:

the zoom lens according to claim 1; and an image pickup device arranged to receive light of an image formed by the zoom lens.

\*     \*     \*     \*     \*